US012611046B2

(12) United States Patent
Kennedy et al.

(10) Patent No.: US 12,611,046 B2
(45) Date of Patent: Apr. 28, 2026

(54) PUMP APPARATUS AND ASSOCIATED SYSTEM AND METHOD

(71) Applicant: Sage Products, LLC, Cary, IL (US)

(72) Inventors: Jeffrey A. Kennedy, Algonquin, IL (US); Ryan A. Alvarez, Crystal Lake, IL (US); Gregory T. Davis, Woodstock, IL (US); Brian J. Ecklund, Lakemoor, WI (US); Craig S. Golden, Arlington Heights, IL (US); Curtis L. Hollabaugh, Huntley, IL (US)

(73) Assignee: Sage Products, LLC, Cary, IL (US)

( * ) Notice: Subject to any disclaimer, the term of this patent is extended or adjusted under 35 U.S.C. 154(b) by 678 days.

(21) Appl. No.: 17/971,927

(22) Filed: Oct. 24, 2022

(65) Prior Publication Data

US 2023/0037511 A1      Feb. 9, 2023

Related U.S. Application Data

(63) Continuation of application No. 16/909,345, filed on Jun. 23, 2020, now Pat. No. 11,478,086, which is a continuation of application No. 15/218,396, filed on Jul. 25, 2016, now Pat. No. 10,905,247.

(60) Provisional application No. 62/206,652, filed on Aug. 18, 2015.

(51) Int. Cl.
| | |
|---|---|
| *A47C 27/08* | (2006.01) |
| *A47L 7/00* | (2006.01) |
| *A61G 7/00* | (2006.01) |
| *A61G 7/057* | (2006.01) |
| *A61G 7/10* | (2006.01) |
| *B23P 19/00* | (2006.01) |
| *F16L 11/118* | (2006.01) |

(52) U.S. Cl.
CPC .............. *A47C 27/082* (2013.01); *A47L 7/00* (2013.01); *A61G 7/05761* (2013.01); *A61G 7/05776* (2013.01); *A61G 7/1073* (2013.01); *B23P 19/00* (2013.01); *F16L 11/118* (2013.01); *A61G 7/001* (2013.01)

(58) Field of Classification Search
CPC .. A47C 27/082; A61G 7/001; A61G 7/05761; A61G 7/05776; A61G 7/1073; A47L 7/00; A47L 9/0009; A47L 9/0018; A47L 9/0027; A47L 9/0036; A47L 9/0045; F16L 11/118; B23P 19/00
USPC ................................................. 5/612; 15/323
See application file for complete search history.

(56) References Cited

U.S. PATENT DOCUMENTS

| | | | |
|---|---|---|---|
| 1,504,945 | A | 8/1924 | Dempsey et al. |
| 1,940,244 | A | 12/1933 | Carlstedt |
| 2,683,888 | A | 7/1954 | Ripple |
| 2,918,228 | A | 12/1959 | Waller |
| 3,083,396 | A | 4/1963 | Senne et al. |
| 3,458,892 | A | 8/1969 | Kobayashi et al. |

(Continued)

FOREIGN PATENT DOCUMENTS

WO      WO-2015/081271 A2      6/2015

*Primary Examiner* — David R Hare
(74) *Attorney, Agent, or Firm* — Foley & Lardner LLP

(57) ABSTRACT

A pump apparatus includes a pump configured for moving air, a housing supporting the pump, and an air output hose in communication with the pump. The housing further includes a rest for retaining a portion of the air output hose. The rest forms a u-shape having two side walls and a valley therebetween.

20 Claims, 21 Drawing Sheets

(56) References Cited

U.S. PATENT DOCUMENTS

| | | | |
|---|---|---|---|
| 3,906,584 A | 9/1975 | Hult | |
| 3,924,116 A | 12/1975 | Brindley | |
| 4,391,009 A | 7/1983 | Schild et al. | |
| 4,627,426 A | 12/1986 | Wegener et al. | |
| 4,658,465 A | 4/1987 | Keane et al. | |
| 4,683,917 A | 8/1987 | Bartholomew | |
| 4,756,697 A | 7/1988 | Hefling | |
| 4,766,662 A * | 8/1988 | Bradshaw | F01P 11/04 |
| | | | 138/156 |
| 4,945,588 A | 8/1990 | Cassidy et al. | |
| 5,023,973 A | 6/1991 | Tsuchida et al. | |
| 5,067,189 A | 11/1991 | Weedling et al. | |
| D328,602 S | 8/1992 | Peterson | |
| 5,191,673 A | 3/1993 | Damizet | |
| 5,235,713 A | 8/1993 | Guthrie et al. | |
| D339,143 S | 9/1993 | Whitley, II | |
| 5,249,319 A | 10/1993 | Higgs | |
| 5,318,328 A * | 6/1994 | Dawson | F16L 37/004 |
| | | | 285/903 |
| 5,331,714 A * | 7/1994 | Essex | A47L 9/0009 |
| | | | 15/323 |
| 5,561,873 A | 10/1996 | Weedling | |
| 5,606,767 A | 3/1997 | Crlenjak et al. | |
| 5,742,958 A | 4/1998 | Solazzo | |
| D395,317 S | 6/1998 | Karlsson et al. | |
| 5,850,665 A | 12/1998 | Bousset | |
| D420,011 S | 2/2000 | Tsa | |
| 6,073,291 A | 6/2000 | Davis | |
| 6,145,160 A | 11/2000 | Buss et al. | |
| 6,241,199 B1 | 6/2001 | Ismert | |
| D445,804 S | 7/2001 | Tsai | |
| 6,341,626 B1 * | 1/2002 | Davenport | H02G 3/0468 |
| | | | 138/110 |
| 6,367,118 B1 * | 4/2002 | Berfield | A47L 9/248 |
| | | | 24/339 |
| 6,374,435 B1 | 4/2002 | Leininger et al. | |
| 6,467,106 B1 | 10/2002 | Heimbrock | |
| 6,484,348 B1 | 11/2002 | Paterson et al. | |
| 6,502,276 B2 * | 1/2003 | Iversen | A47L 9/0036 |
| | | | 15/246.2 |
| 6,546,576 B1 | 4/2003 | Lin | |
| 6,607,010 B1 | 8/2003 | Kashy | |
| 6,698,041 B2 | 3/2004 | Vansteenburg et al. | |
| 6,701,544 B2 | 3/2004 | Heimbrock | |
| 6,701,552 B2 | 3/2004 | Suzuki et al. | |
| 6,820,292 B2 | 11/2004 | Heimbrock | |
| 6,865,773 B2 | 3/2005 | Tsen | |
| 6,898,809 B2 | 5/2005 | Davis | |
| 7,028,350 B1 | 4/2006 | Davis | |
| 7,032,261 B2 | 4/2006 | Heimbrock | |
| 7,036,163 B2 | 5/2006 | Schmid | |
| 7,107,641 B2 | 9/2006 | Davis | |
| 7,114,204 B2 * | 10/2006 | Patrick | A61G 7/1034 |
| | | | 5/81.1 R |
| 7,131,154 B2 | 11/2006 | Davis et al. | |
| 7,168,115 B2 | 1/2007 | Davis | |
| 7,188,387 B2 | 3/2007 | Dicioccio | |
| 7,210,176 B2 | 5/2007 | Weedling et al. | |
| 7,228,592 B2 | 6/2007 | Hawkins et al. | |
| 7,243,382 B2 | 7/2007 | Weedling et al. | |
| 7,266,852 B2 | 9/2007 | Davis | |
| 7,340,785 B2 | 3/2008 | Weedling et al. | |
| 7,373,680 B2 | 5/2008 | Davis | |
| 7,376,995 B2 | 5/2008 | Davis | |
| 7,406,723 B2 | 8/2008 | Davis | |
| 7,415,738 B2 | 8/2008 | Weedling et al. | |
| 7,467,431 B2 | 12/2008 | Weedling et al. | |
| 7,565,709 B2 | 7/2009 | Davis | |
| 7,574,761 B2 | 8/2009 | Davis | |
| 7,591,029 B2 | 9/2009 | Weedling et al. | |
| 7,627,910 B2 | 12/2009 | Davis | |
| 7,681,262 B2 | 3/2010 | Weedling et al. | |
| 7,712,170 B2 | 5/2010 | Davis | |
| 7,735,164 B1 | 6/2010 | Patrick | |
| 7,739,758 B2 | 6/2010 | Weedling et al. | |
| 7,900,299 B2 | 3/2011 | Weedling et al. | |
| D649,164 S | 11/2011 | Cook | |
| 8,234,727 B2 | 8/2012 | Schreiber et al. | |
| 8,276,222 B1 | 10/2012 | Patrick | |
| 8,387,177 B2 | 3/2013 | Davis | |
| 8,413,277 B2 | 4/2013 | Davis et al. | |
| 8,465,597 B2 | 6/2013 | Turner | |
| 8,566,977 B2 | 10/2013 | Davis | |
| 8,683,644 B2 * | 4/2014 | Conrad | A47L 9/26 |
| | | | 242/400.1 |
| 8,701,338 B1 | 4/2014 | Walsh, Jr. | |
| D708,648 S | 7/2014 | Orsini | |
| 9,167,942 B1 * | 10/2015 | Seasholtz | A47L 9/0027 |
| 9,782,016 B2 | 10/2017 | Aramli | |
| 9,849,053 B2 | 12/2017 | Rigoni et al. | |
| 10,201,234 B2 | 2/2019 | Nunn et al. | |
| 2004/0103949 A1 | 6/2004 | Rickards | |
| 2005/0055794 A1 | 3/2005 | Marshall et al. | |
| 2006/0096057 A1 * | 5/2006 | Chatfield | A47L 9/2857 |
| | | | 15/339 |
| 2006/0179601 A1 | 8/2006 | Crevling et al. | |
| 2007/0136952 A1 | 6/2007 | Sargent | |
| 2007/0209119 A1 | 9/2007 | Chun-Chu | |
| 2007/0246118 A1 | 10/2007 | Wagner et al. | |
| 2008/0011356 A1 | 1/2008 | Schuster | |
| 2009/0064415 A1 | 3/2009 | Payne et al. | |
| 2009/0093912 A1 | 4/2009 | Wilker, Jr. | |
| 2009/0223584 A1 * | 9/2009 | Gray | F16L 13/148 |
| | | | 138/104 |
| 2011/0040288 A1 | 2/2011 | Eckstein et al. | |
| 2011/0185869 A1 * | 8/2011 | Wasielewski | B25F 5/02 |
| | | | 83/100 |
| 2012/0124752 A1 * | 5/2012 | Patrick | A61G 7/05769 |
| | | | 5/706 |
| 2012/0222236 A1 * | 9/2012 | Conrad | A47L 9/0036 |
| | | | 15/323 |
| 2012/0260944 A1 | 10/2012 | Martins et al. | |
| 2014/0082836 A1 * | 3/2014 | Patrick | A47C 27/081 |
| | | | 5/81.1 HS |
| 2014/0109319 A1 | 4/2014 | Wilkinson | |
| 2014/0130930 A1 | 5/2014 | Ragner | |
| 2014/0255627 A1 | 9/2014 | Yamaguchi et al. | |
| 2015/0121619 A1 | 5/2015 | Aramli | |
| 2016/0046355 A1 | 2/2016 | Faletra | |
| 2016/0160506 A1 | 6/2016 | Studebaker et al. | |
| 2016/0284193 A1 * | 9/2016 | Davis | G08B 21/18 |
| 2019/0045989 A1 | 2/2019 | Castaldi, III | |

* cited by examiner

PUMP APPARATUS AND ASSOCIATED SYSTEM AND METHOD

CROSS-REFERENCE TO RELATED APPLICATION

This application is a continuation of U.S. patent application Ser. No. 16/909,345, filed Jun. 23, 2020, which is a continuation of U.S. patent application Ser. No. 15/218,396, filed Jul. 25, 2016, which claims the benefit of and priority to U.S. Provisional Application No. 62/206,652, filed Aug. 18, 2015, all of which prior applications are incorporated by reference herein in their entireties.

TECHNICAL FIELD

The present disclosure generally relates to a pump apparatus configured for pumping air or another fluid, which may include various features providing mobility, safety, and/or improved functionality, as well as examples of a system and method for patient care in which the pump apparatus is usable.

BACKGROUND

Nurses and other caregivers at hospitals, assisted living facilities, and other locations often care for patients that have limited or no mobility, many of whom are critically ill or injured. In these patients, healthcare workers must devote a significant amount of time, attention, and effort to moving patients, either within the bed to prevent the development of pressure ulcers or from the bed to another support surface, such as a gurney, stretcher, or wheelchair. There are several methods employed to effect such movement, including the use of slide boards, draw sheets, and/or overhead mechanical patient lifts. Recently, one field of technological innovation has focused on the use of air supplies and patient transport mattresses to accomplish these tasks. Examples of such devices and products are shown in U.S. Pat. Nos. 7,735,164 and 8,276,222 and U.S. patent application Ser. No. 14/829,361, all of which are incorporated by reference herein in their entireties. These devices provide generally effective means for moving a patient in a manner that is safe for both the patient and the healthcare provider.

One limitation of the technology in the air-assisted patient movement field is the current state of the air supplies, or pumps, used to inflate the transfer mattresses. These pumps generally take up a great deal of floor space, presenting a tripping hazard to the healthcare workers and interfering with the task at hand. Moreover, the air supply connects to the transfer mattress via a hose or tube. This hose may be from two feet up to 25 feet long, depending on its location or function in the healthcare facility (e.g., 25-foot long hoses are often necessary in MM suites, where the metal pump cannot be placed inside the suite). Nevertheless, the power switch for the air supply is located on the body of the pump itself, not at a location convenient to the caregiver while he or she is bedside with the patient. Such configurations require the caregiver to physically move away from the bedside, diverting not only his or her body and hands but also his or her attention from the patient. Such diversion increases the risk of injury to the patient, as the caregiver cannot react to sudden shifts, slips, or falls of the patient's body.

Furthermore, existing technology in the field of air supplies does not adequately account for the concerns or priorities of a healthcare environment. The pumps are not designed to maintain the operator's attention on the patient. Moreover, the pumps are not designed to prevent bacterial or viral contamination of the patient, the transfer mattress, or the room.

The present disclosure seeks to overcome certain of these limitations and other drawbacks of existing devices, systems, and methods, and to provide new features not heretofore available.

SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention and the disclosure in a general form as a prelude to the more detailed description provided below.

Aspects of the disclosure relate to a pumping apparatus that includes a pump configured for moving air, a housing supporting and at least partially containing the pump, and an air output that includes a hose having a first end connected to the housing and in communication with the pump, such that the pump is configured to move air through the hose, and a second end configured for allowing air to exit the hose, wherein the hose has a length defined between the first and second ends. A switch is mounted on the hose and located along the length of the hose, and the switch is configured for controlling operation of the pump. The switch is located a distance from the second end of the hose that is less than 50% of the length of the hose, and may be less than 25% of the length of the hose. The switch may be located less than 12 inches from the second end of the hose in this configuration.

According to one aspect, the apparatus also includes a casing connected to the hose and supporting the switch. The entire casing, or at least a portion of the casing, may be located less than 50% of the length of the hose away from the second end. The casing may have a structure that includes a passage with opposed ends, where the hose is connected to and in communication with the passage at both of the opposed ends. The casing may include a lip surrounding the switch, where a top of the switch is recessed from a top of the lip, e.g., by at least 5 mm in one configuration. The lip may have a recess on one side that is recessed with respect to adjacent portions of the top of the lip.

According to another aspect, the apparatus includes a plurality of wheels connected to a side of the housing and configured to permit the apparatus to rest moveably on the wheels, and a base connected to an end of the housing adjacent the side and configured to permit the apparatus to rest in a stationary manner on the base.

According to a further aspect, the apparatus includes a clip connected to the housing, where the clip and the hose include complementary components, such that the clip is configured for releasable connection to the hose through friction between the complementary components.

According to a still further aspect, the apparatus further includes a hose cover covering the hose, where the hose cover includes an elongated sleeve having an end located proximate the second end of the hose and extending from proximate the second end of the hose to the first end of the hose. The hose cover also includes a connector removably connecting the end of the sleeve to the hose proximate the first end. The hose cover may further include a mount connected to the sleeve at a fixed end of the sleeve opposite the end, the mount including a tubular body supporting the sleeve and defining a central passage, where the hose extends through the central passage and the mount is located proximate the second end of the hose.

Additional aspects of the disclosure relate to a system that includes an inflatable device configured to be placed on a supporting surface of a bed and further configured to support a patient above the supporting surface of the bed, with the inflatable device having an inflation port configured to permit inflation of the device, and a pumping apparatus according to aspects described above, where the second end of the hose is configured to be connected to the inflation port to pump air into the inflatable device and thereby inflate the inflatable device.

According to one aspect, the hose may have an end portion at the second end and the end portion is rigid or semi-rigid, while a majority of the hose is flexible. According to another aspect, the inflation device may have a retaining mechanism located at the inflation port and configured to retain the second end of the hose within the inflation port. The end portion of the hose may have an engagement structure to facilitate engagement by the retaining mechanism. For example, the engagement structure may be or include a flange extending outwardly around a periphery of the end portion.

Further aspects of the disclosure relate to a pumping apparatus that includes a pump configured for moving air, a housing supporting and at least partially containing the pump, and an air output comprising a hose connected to the housing and in communication with the pump, such that the pump is configured to move air through the hose, with the hose having an outlet configured for allowing air to exit the hose. The housing has a first end, a second end, and a side extending between the first and second ends, such that the largest dimension of the housing is defined between the first and second ends. A plurality of wheels are connected to the side of the housing and configured to permit the apparatus to rest moveably on the wheels, and a base is connected to the first end of the housing and configured to permit the apparatus to rest in a stationary manner on the base.

According to one aspect, the apparatus further includes a base mount connecting the base to the first end of the housing, such that the base is spaced from the first end of the housing. The base mount may have a smaller peripheral dimension than the base and/or a smaller peripheral dimension than the first end of the housing. The apparatus may further include a power cord connected to the pump and configured for supplying electric power to the pump, and at least a portion of the power cord may be wrapped around the base mount in this configuration.

According to another aspect, the apparatus further includes a switch mounted on the hose and located along a length of the hose, where the switch is configured for controlling operation of the pump. The switch is located a distance from the outlet of the hose that is less than 50% of the length of the hose, and may be less than 25% of the length of the hose. The switch may be located less than 12 inches from the outlet of the hose in this configuration.

According to a further aspect, the apparatus further includes a hose cover covering the hose, where the hose cover includes an elongated sleeve having an end located proximate the outlet of the hose and extending from proximate the outlet of the hose toward the pump. The hose cover also includes a connector removably connecting the end of the sleeve to the hose proximate the outlet. The hose cover may further include a mount connected to the sleeve at a fixed end of the sleeve opposite the end, the mount including a tubular body supporting the sleeve and defining a central passage, where the hose extends through the central passage and the mount is located proximate the pump. The mount may have a plurality of flanges or tabs that allow for attachment of the mount to the pump housing by twisting or snapping into place with complementary flanges or tabs on the pump housing.

Still further aspects of the disclosure relate to a system including a bed resting on a ground surface and having a supporting surface, an inflatable device resting on the supporting surface of the bed and configured for supporting a patient above the supporting surface of the bed, the inflatable device having an inflation port configured to permit inflation of the device, and a pumping apparatus according to aspects described above. A space is defined between the ground surface and an underside of the bed, and when the apparatus is resting on the wheels on the ground surface, the apparatus has a maximum height defined normal to the ground surface that permits the pump apparatus to rest in the space beneath the underside of the bed.

According to one aspect, the pumping apparatus further includes a base mount connecting the base to the first end of the housing, such that the base is spaced from the first end of the housing. The base mount may have a smaller peripheral dimension than the base and/or the first end of the housing. The pumping apparatus may also include a power cord connected to the pump and configured for supplying electric power to the pump, where at least a portion of the power cord is wrapped around the base mount.

According to another aspect, the pumping apparatus further includes a switch mounted on the hose and located along a length of the hose, where the switch is configured for controlling operation of the pump. The switch is located a distance from the outlet of the hose that is less than 50% of the length of the hose, and may be less than 25% of the length of the hose. The switch may be located less than 12 inches from the outlet of the hose in this configuration.

Yet additional aspects of the disclosure relate to a hose cover that includes a mount having a tubular body defining a central passage, a sleeve supported by the mount such that the tubular body is received within the sleeve, such that the sleeve has a first end configured to be pulled from the tubular body along with at least a portion of a length of the sleeve in order to cover a hose. The tubular body may have a circular shape in one configuration or a non-circular shape in other configurations.

According to one aspect, the hose cover includes a connector connected to the sleeve proximate the first end and supported by the tubular body, such that the connector is configured to removably connect the first end of the sleeve to the hose when the first end of the sleeve is pulled from the tubular body. The mount may further include a retaining structure configured to engage the connector and retain the connector in position on the tubular body. The connector may be an elastic ring in one configuration. In this configuration, the retaining structure may be an annular recess extending at least partially around the tubular body, where the elastic ring is received in the annular recess.

According to another aspect, the mount further includes a flange extending outward from the tubular body, and the sleeve is configured to be pulled from the tubular body at an end of the tubular body distal from the flange.

Other aspects of the disclosure relate to methods of using the apparatuses and/or systems described above, including use of the pumping apparatus to inflate an inflatable device as described herein. The inflatable device may first be placed on the supporting surface of the bed, with the patient placed on top of the inflatable device. After inflation, the inflatable device can be moved in order to move the patient and subsequently deflated as desired. The methods may additionally or alternately include installation of the hose cover as described herein. The hose cover may be installed by inserting a hose (e.g., the hose of a pumping apparatus) into the central passage of the mount, pulling the first end of the sleeve from the tubular body and connecting the first end of the sleeve to the hose, and moving the mount along a length of the hose away from the first end and toward the pumping apparatus to pull additional portions of the sleeve from the hose, such that the sleeve covers the hose. The mount may be releasably connected to the pumping apparatus, and the mount and/or the pumping apparatus may have structure for such a releasable connection. The hose cover can be removed by moving the mount away from the pumping apparatus to remove the mount from the hose and thereby remove the sleeve from the hose, where the movement of the mount away from the pumping apparatus pulls the sleeve inside-out during removal.

Other features and advantages of the invention will be apparent from the following description taken in conjunction with the attached drawings.

BRIEF DESCRIPTION OF THE FIGURES

To understand the present invention, it will now be described by way of example, with reference to the accompanying drawings in which.

DETAILED DESCRIPTION

Figure 1:
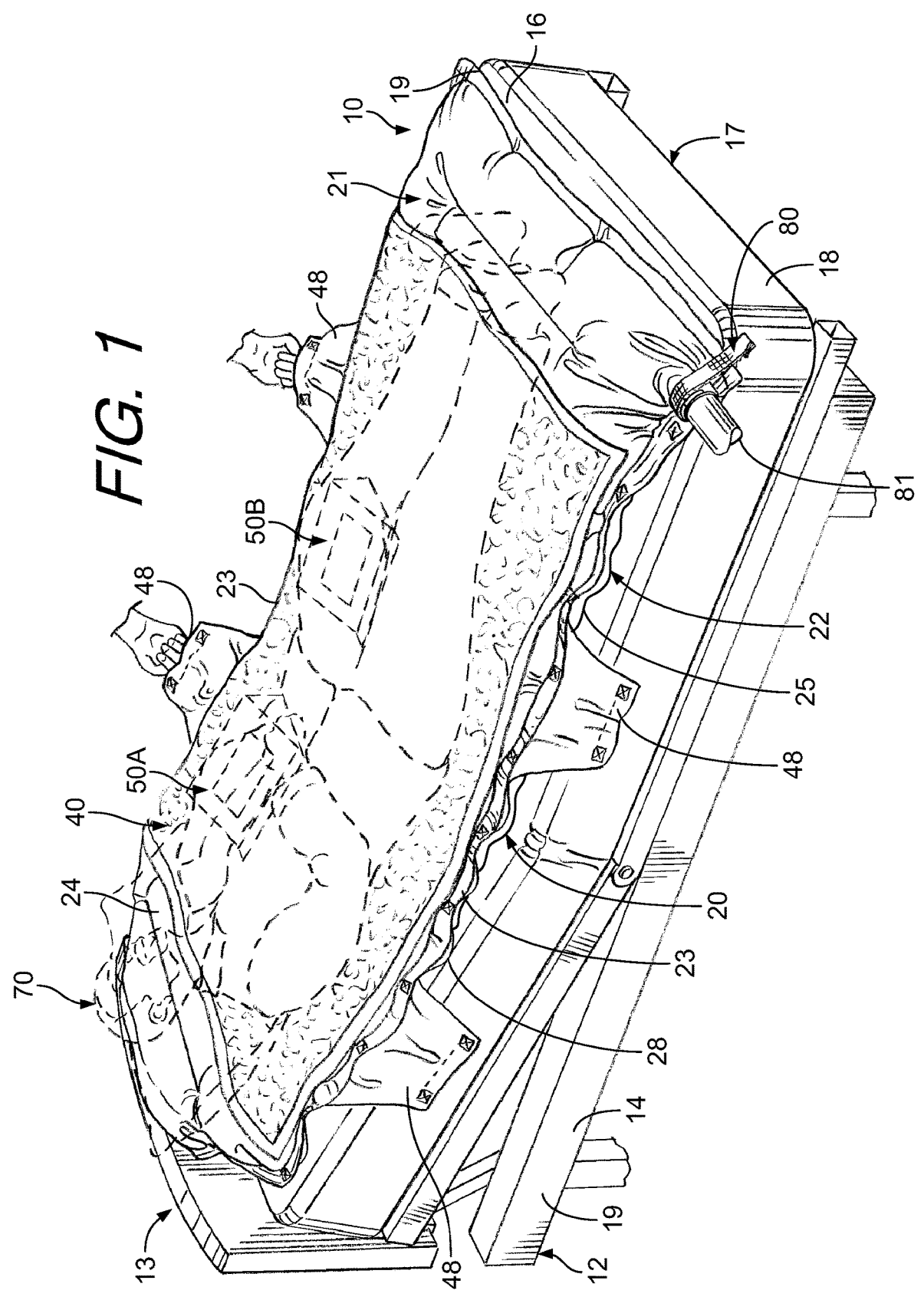
FIG. 1 is a perspective view of one embodiment of a system for use in turning and positioning a patient, according to aspects of the disclosure, with a patient shown in broken lines.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

In general, the disclosure relates to a pump apparatus that is configured for pumping air or another fluid. The pump may be used in connection with an inflatable patient support device, but may also be used in other applications as well. Examples of inflatable patient support devices and systems incorporating such devices are illustrated in U.S. patent application Ser. No. 14/829,361, filed Aug. 18, 2015, which application is incorporated herein in its entirety and made part hereof. Various embodiments of the invention are described below.

Figure 2:
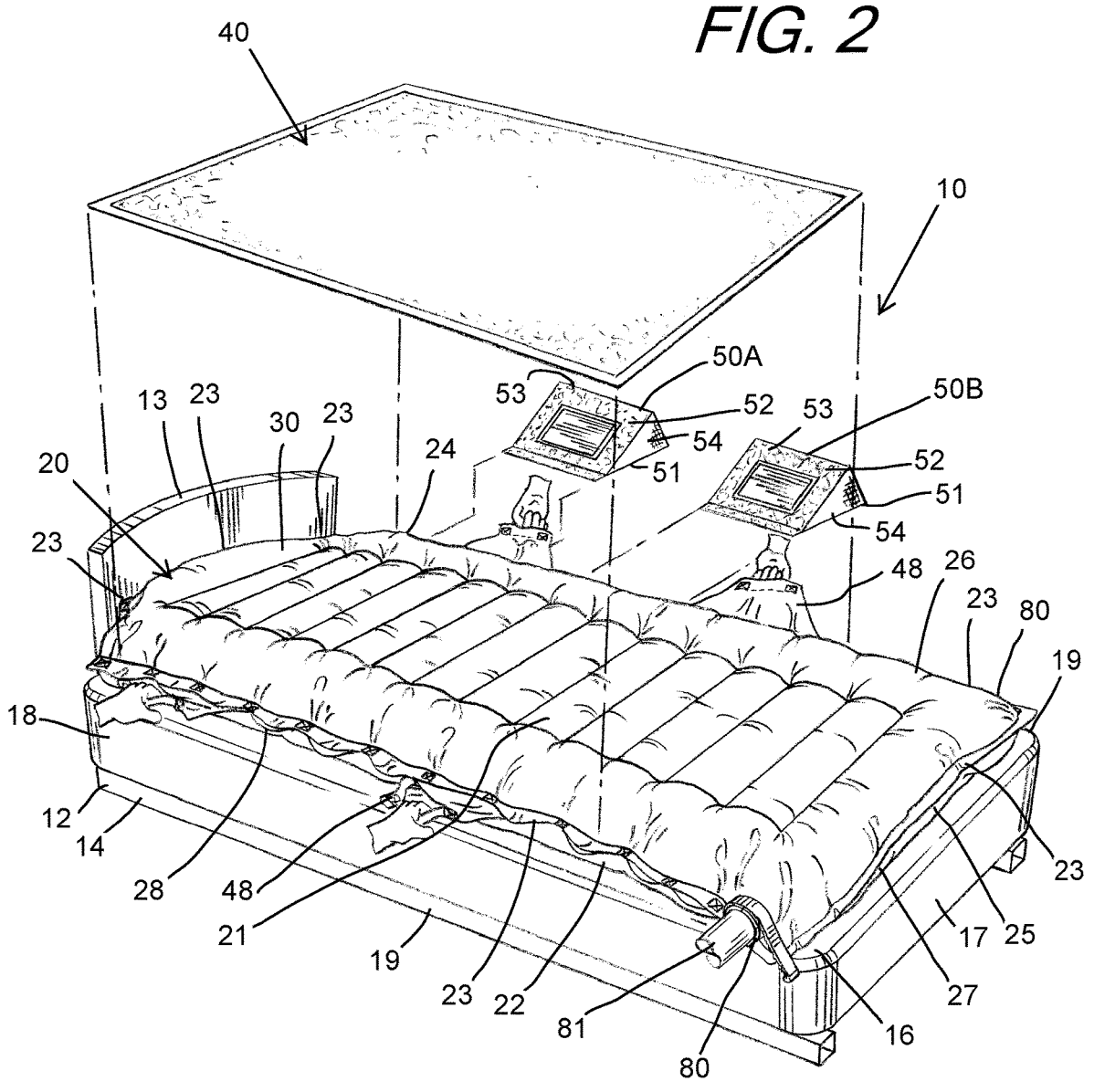
FIG. 2 is a partially-exploded perspective view of the system of FIG. 1.
Figure 3:
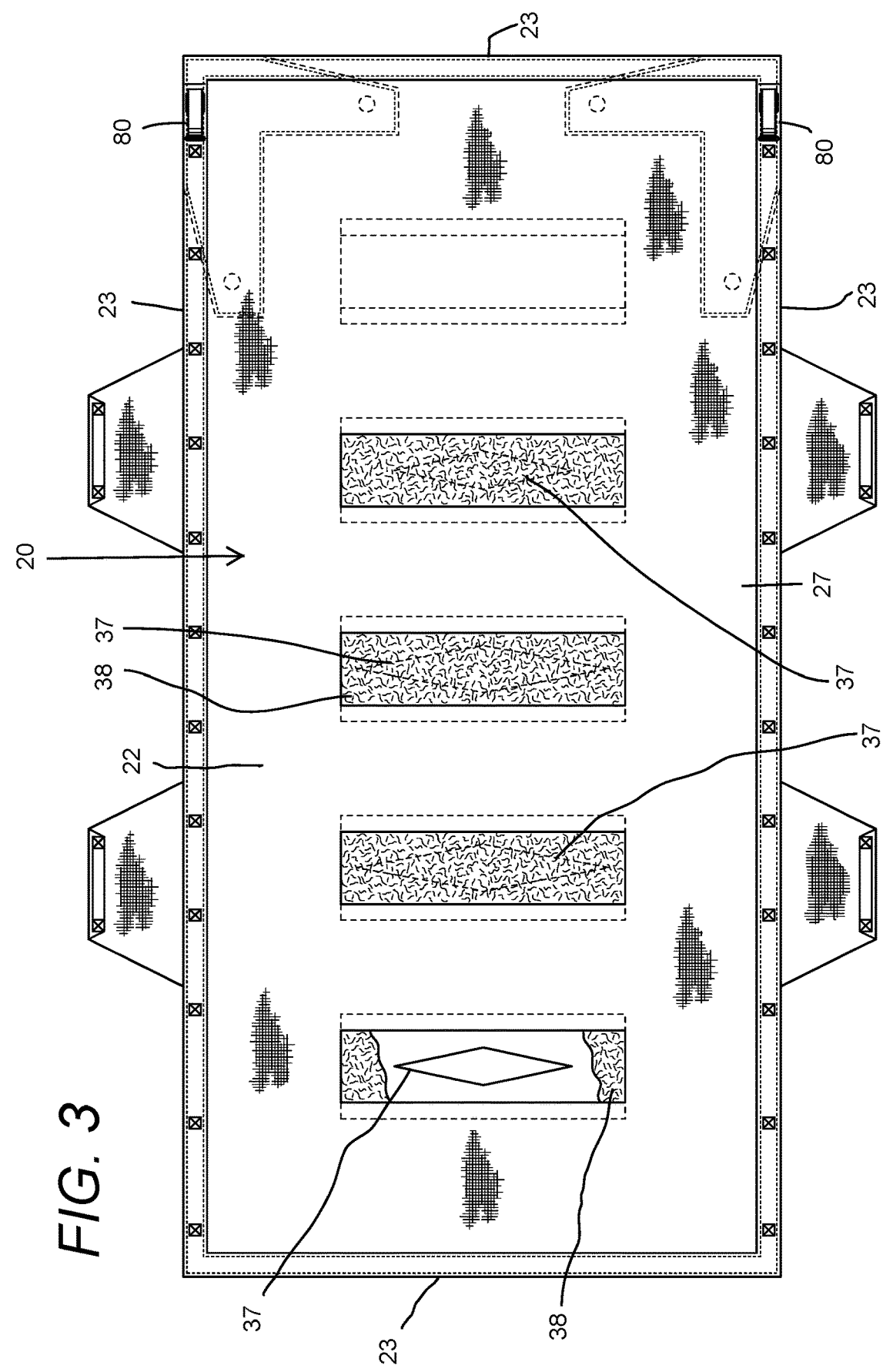
FIG. 3 is a bottom view of an inflatable patient support device usable with the system of FIGS. 1-2.

Referring now to the figures, and initially to FIGS. 1-3, there is shown an example embodiment of a system 10 for use in turning and positioning a person resting on a surface, such as a patient lying on a hospital bed. As shown in FIG. 1, the system 10 includes an inflatable patient support device (hereinafter, "device") 20, an absorbent body pad 40 configured to be placed over the device 20, and one or more wedges 50 configured to be placed under the device 20. The patient can be positioned on top of the body pad 40, with the body pad 40 lying on the device 20, and one or more wedges 50A,B optionally positioned underneath the device 20.

As shown in FIGS. 1-3, the system 10 is configured to be placed on a bed 12 or other support apparatus for supporting a person in a supine position. The bed 12 generally includes a frame 14 and a supporting surface 16 supported by the frame 14, as shown in FIGS. 1-3, and has a head 13, a foot 17 opposite the head 13, and opposed sides or edges 19 extending between the head 13 and the foot 17. The supporting surface 16 can be provided by a mattress 18 or similar structure, and in various embodiments, the mattress 18 can incorporate air pressure support, alternating air pressure support and/or low-air-loss (LAL) technology. These technologies are known in the art, and utilize a pump motor or motors (not shown) to effectuate airflow into, over and/or through the mattress 18. For beds having LAL technology, the top of the mattress 18 may be breathable so that the airflow can pull heat and moisture vapor away from the patient. The bed 12 may also include one or more bed sheets (such as a fitted sheet or flat sheet), as well as pillows, blankets, additional sheets, and other components known in the art. Further, the bed 12 may be an adjustable bed, such as a typical hospital-type bed, where the head 13 (or other parts) of the bed 12 can be raised and lowered, such as to incline the patient's upper body. It is understood that the system 10 and the components thereof can be used with other types of beds 12 as well.

An example embodiment of the inflatable patient support device 20 is shown in greater detail in FIGS. 1-3. In general, the device 20 is flexible and foldable when in the non-inflated state, and has a top surface 21 and a bottom surface 22 defined by a plurality of peripheral edges 23. The device 20 is configured to be positioned on the bed 12 so that the bottom surface 22 is above the supporting surface 16 of the bed 12 and faces or confronts the supporting surface 16, and is supported by the supporting surface 16. As used herein, "above," "below," "over," and "under" do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet as described above. Likewise, "facing" or "confronting" does not imply direct contact or engagement, and may include one or more structures located between the surface and the structure it is confronting or facing.

The device 20 generally includes an inflatable body 30 that includes an internal cavity 31 configured to be inflated with air or another gaseous substance. The inflatable body 30 is defined by at least a top sheet 26 forming a top wall of the cavity 31 and a bottom sheet 27 forming a bottom wall of the cavity 31, with the top sheet 26 and the bottom sheet 27 connected together to define the cavity 31 between them. In the embodiment shown in FIGS. 1-3, the top and bottom sheets 26, 27 are two separate pieces of sheet material that are connected together around their peripheries, such as by stitching and/or adhesives, or one or more other connection techniques described herein. In other embodiments, the top and bottom sheets 26, 27 may be made from a single piece of material that is folded over and connected by stitching along the free ends or that is formed in a loop, or the top and/or bottom sheets 26, 27 may be formed of multiple pieces. Both the top and bottom sheets 26, 27 may be formed of the same material in one embodiment, although these components may be formed of different materials in another embodiment. It is understood that either or both of the sheets 26, 27 may have a single layer or multiple layers that may be formed of the same or different materials. Additionally, the sheet material(s) of the top and bottom sheets 26, 27 may have properties that are desirable for a particular application.

For example, the sheets 26, 27 may be breathable fabrics or other materials that have sufficient resistance to air passage to retain inflation of the inflatable body 30, while maintaining sufficient breathability to allow passage of heat and moisture vapor away from the patient, thereby enabling the device 20 to be left beneath a patient indefinitely. Such a device 20 may be used in a complementary manner with low air-loss beds, as mentioned above. The inflatable body 30 of the device 20 may include one or more inflation-limiting members to create a specific inflated shape 20 for the device. In the embodiment illustrated in FIGS. 1-3, the inflatable body 30 has a plurality of gussets (not shown) connected to the top sheet 26 and the bottom sheet 27 and extending across the cavity 31. The fully inflated device 20 has a shape that is defined by the configuration of the edges 23 of the device 20 and the size, shape, and configurations of the gussets, among other factors.

The device 20 as illustrated in FIGS. 1-3 includes a plurality of passages 37 in the bottom sheet 27 that permit air to pass from the cavity 31 to the exterior of the device 20. The passages 37 extend from the cavity 31 through the bottom sheet 27 to the exterior of the device 20 on the bottom surface 22. Air passing through the passages 37 is forced between the bottom surface 22 of the device 20 and the surface upon which the device 20 sits (e.g., the supporting surface 16 of the bed 12), reducing friction between the bottom surface 22 and the supporting surface. This permits easier movement of the device 20 when a patient 70 is positioned on the device 20. Some or all of the passages 37 may be covered by an air-permeable material, such as portions of the gussets or other materials, which may have a greater permeability than the materials forming the top and bottom sheets 26, 27. Examples of such covers 38 are shown in FIG. 3. As used herein, an "air-permeable material" is a material that permits air to pass through, without the necessity for manually forming holes, passages, perforations, slits, openings, etc., in the material, such as by mechanical and/or laser cutting methods.

In the embodiment illustrated in FIGS. 1-3, the top surface 21 of the device 20 has at least a portion formed of a high-friction or gripping material 24, and the bottom surface 22 has at least a portion formed of a low-friction material 25. The components of the system 10 may also include materials with directional friction properties. In one embodiment, as illustrated in FIGS. 1-3, the device 20 may also include one or more handles 28, 48 to facilitate pulling and other movement of the device 20.

The system 10 may include one or more wedges 50A-B that can be positioned under the device 20 to provide a ramp and support to slide and position the patient slightly on his/her side, as described below. The wedge 50A-B has a body 56 that can be triangular in shape, having a base wall or base surface 51, a ramp surface 52 that is positioned at an oblique angle to the base wall 51, a back wall 53, and side walls 54. In other embodiments, the apparatus 10 may include a different type of supporting device other than the wedges 50A-B illustrated in FIG. 2, such as a different type or configuration of wedge or a different type of supporting device.

Figures 4, 5:
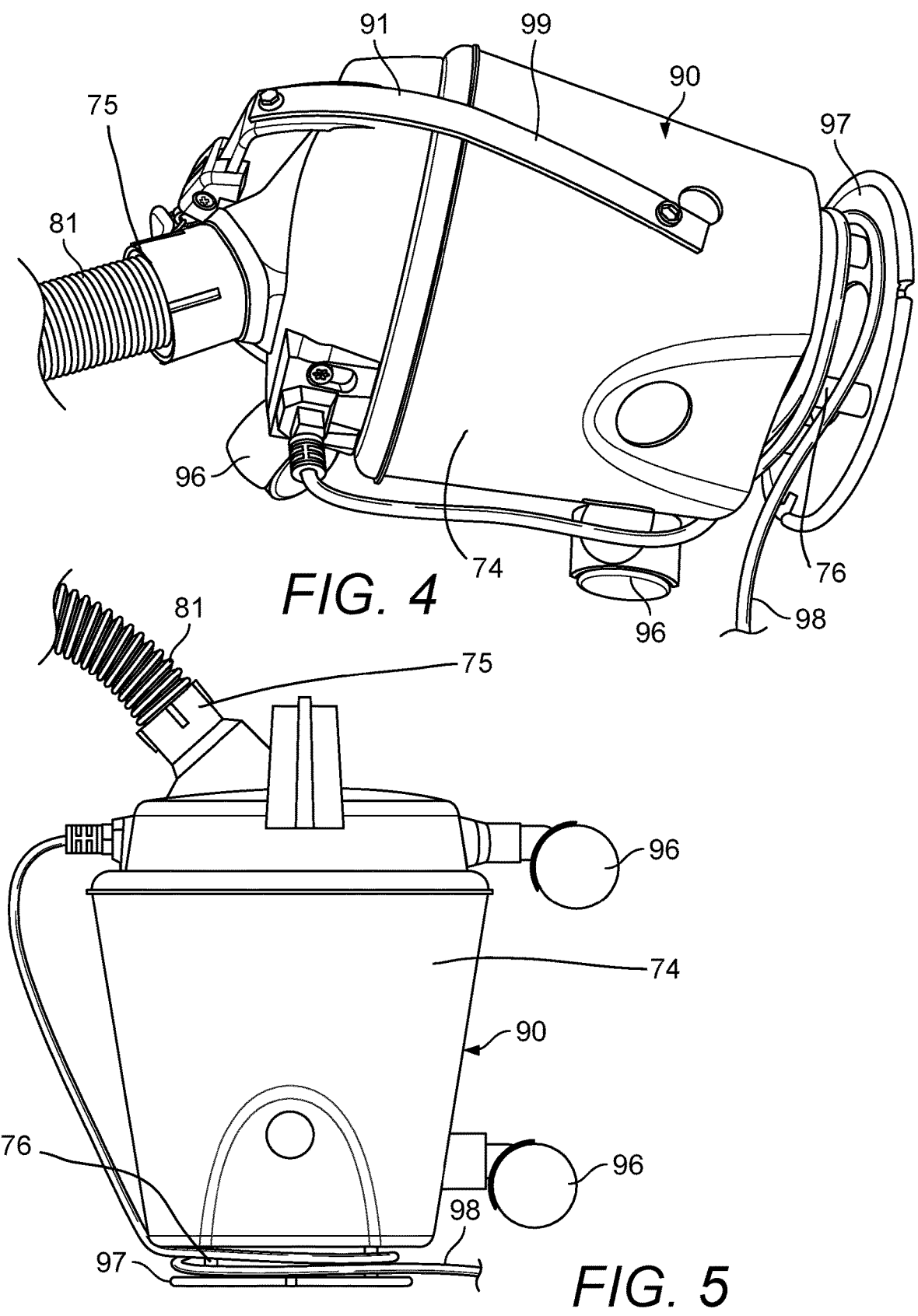
FIG. 4 is a perspective view of a pump according to aspects of the present disclosure.
FIG. 5 is a side view of the pump of FIG. 4.
Figures 6, 7:
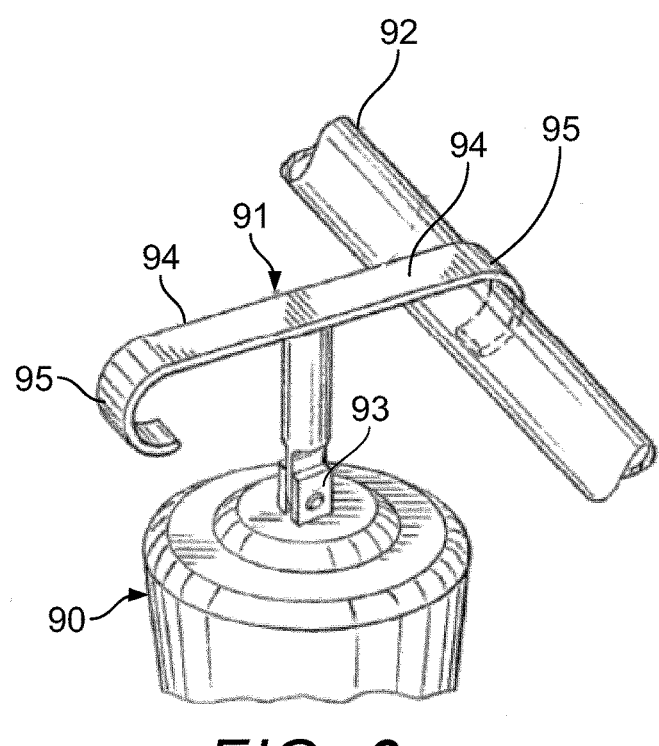
FIG. 6 is a perspective view of a portion of a pump according to aspects of the present disclosure.
FIG. 7 is a perspective view of the inflatable device of FIGS. 1-3 with an air output connected to a port on the inflatable device.
Figure 8:
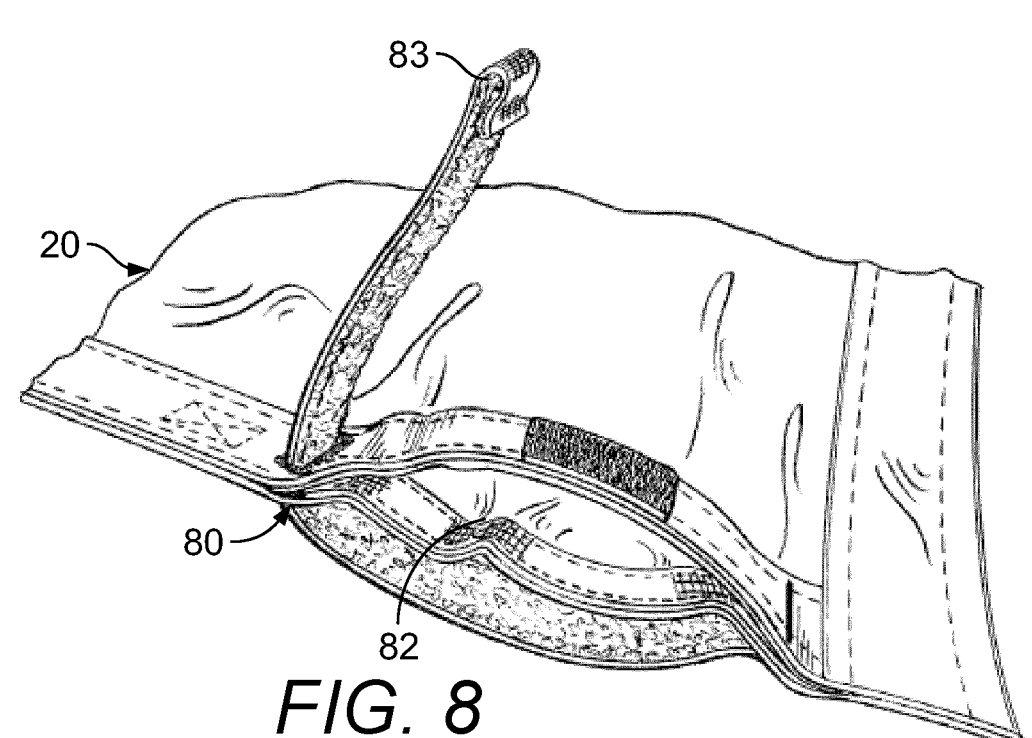
FIG. 8 is a magnified view of the port of the inflatable device shown in FIG. 7.
Figure 9:
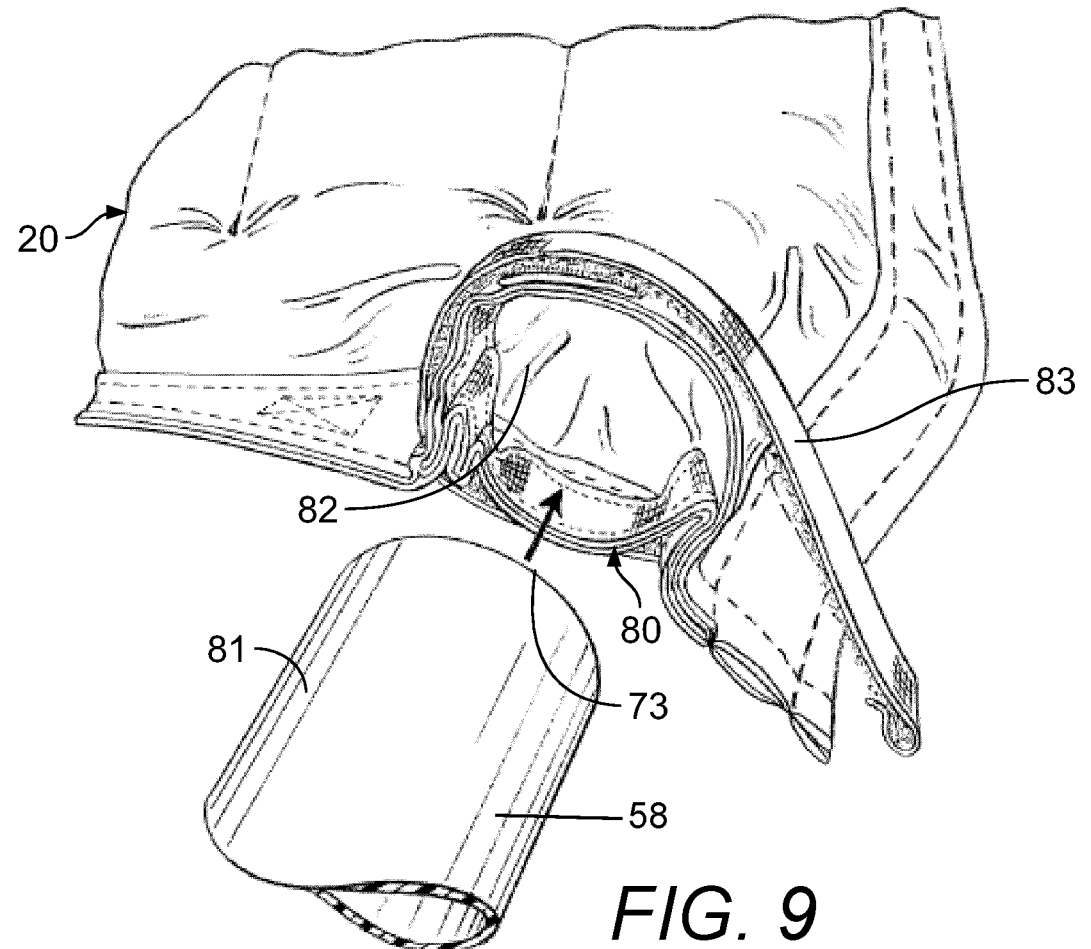
FIG. 9 is a magnified view of the port of the inflatable device shown in FIGS. 7-8, with the air output in position for insertion into the port.

The device 20 may be inflated by connection to an air output 81 as illustrated in FIGS. 1-3 and 6-8. The device 20 may include one or more inflation ports 80 for connection to the air output 81. It is understood that a device 20 with multiple ports 80 may include ports 80 on one or more different edges 23 of the device 20, and that the port(s) 80 may be along any edge 23 of the device 20. In the embodiment of FIGS. 1-3 and 6-8, the device 20 includes two inflation ports 80, each located along one of the side edges 23 of the device 20, proximate the foot edge 23. Generally, only one of the inflation ports 80 is used at a time, and the dual ports 80 provide for use in diverse arrangements, although both ports 80 could be used simultaneously. In one embodiment, each of the ports 80 includes an opening 82 configured to receive a portion of the air output 81 and a retaining mechanism 83 configured to retain the portion of the air output 81 within the opening 82. The retaining mechanism 83 in the embodiment of FIGS. 1-3 and 6-8 is a strap that wraps around the opening 82 and fastens to itself by a hook-and-loop fastener, as illustrated in FIGS. 7-9. Other fasteners could be used, such as snaps, buttons, ties, etc. The air output 81 illustrated in FIGS. 1-3 and 7-9 is a hose that may be connected to a pump 90 (see FIGS. 4-6) that pumps air through the air output 81. As shown in FIGS. 1-3 and 7-9, an end portion 58 of the air output hose 81 is received within the opening 82, and the retaining mechanism 83 (strap) is fastened to secure the air output 81 in place. The end portion 58 of the air output hose 81 may have a rigid structure, in contrast to the flexible structure of the majority of the hose 81, and the end portion 58 may further have an engagement structure to facilitate engagement by the retaining mechanism 83, such as a flange 58A extending outwardly around at least a portion of the periphery of the end portion 58 in the embodiment illustrated in FIGS. 10-11 and 13.

The device 20 may also have a valve 84 in communication with the port 80, as illustrated in FIG. 7. The valve 84 in this embodiment is formed by a pocket 85 that is positioned within the cavity 31 and has an entrance opening 86 in communication with the opening 82 of the port 80 and at least one exit opening 87 in communication with the cavity 31. The pocket 85 may be formed by one or more sheets 88 of flexible material that are folded and/or connected together to define the pocket 85 in the desired shape. Additionally, the pocket 85 may be connected to the inner surfaces of the cavity 31 by stitching or another technique described herein. In the embodiment of FIG. 7, the pocket 85 is stitched to the inside of the device 20 only around the port 80, and the rest of the pocket 85 is free within the cavity 31. The exit opening(s) 87 may be spaced from the entrance opening 86 so that air must flow through the pocket 85 to reach the cavity 31. In this configuration, airflow through the port 80 passes through the valve 84 by flowing from the port 80 through the entrance opening 86, then through the pocket 85 and out through the exit opening 87 into the cavity 31. The pocket 85 in the embodiment of FIG. 7 has two branches 89 extending away from each other, e.g., to form an L-shape, and the exit openings 87 are located near the ends of the branches 89 to space them from the entrance opening and from each other 86. The valve 84 may perform multiple functions. For example, the pocket 85 may compress when there is no inward airflow through the entrance opening 86, thus resisting or preventing reverse airflow through the valve 84 and the port 80 when the port 80 is not being used for inflation (i.e., when another port 80 is being used). As another example, the valve 84 reduces noise and dispersion of the air during inflation. As a further example, the pocket 85 may also protect the air output 81 from contact with dirt, dust, debris, and other matter that may be present within the cavity 31. As yet another example, the positioning of the exit openings 87 in the embodiment illustrated in FIG. 7 makes it difficult or impossible for the patient's leg to rest on top of both of the exit openings 87 of a single valve 84, which could impede air flow through the valve 84. In other embodiments, the valve 84 may be differently configured, such as by having a different shape, a greater or smaller number of exit openings 87, etc. It is understood that the valve 84 and other inflation components of the system 10 are described for use with air, but may be used with any suitable gas. Accordingly, terms such as "air" and "airflow" as used herein may refer to any suitable gas.

As described above, a pump 90 may be used in connection with the inflatable device 20 to supply air to the air output 81 and thereby inflate the device 20. When used for this purpose, the pump 90 may be considered to be a component of the system 10 that includes the device 20. It is understood that the pump 90 may be used in connection with different inflatable patient support devices, or for other purposes as well. One embodiment of a pump 90 according to aspects of the disclosure is shown in FIG. 6. The pump 90 in this embodiment has a hose (not shown) that functions as the air output 81, as described above. Likewise, the pump 90 in this embodiment has a pumping mechanism (not shown) configured for pumping or otherwise moving air through the air output 81. Additionally, the pump 90 has an attachment mechanism 91 that is configured to releasably attach the pump 90 to a structure 92, such as a railing of the bed 12. The use of the attachment mechanism 91 may prevent the pump 90 from moving around during use and potentially dislodging the air output 81 from the port 80 and may keep the pump 90 out of the way of caregivers who may try to maneuver around the bed 12 to deliver care to the patient 70. In the embodiment of FIG. 6, the attachment mechanism 91 is a T-shaped bar that is connected to the pump by a hinge 93 and has two arms 94 with hooks 95 at the ends thereof. These hooks 95 allow either arm to be connected to a structure 92 to hang the pump 90 from the structure 92, as shown in FIG. 6. In other embodiments, the pump 90 may include a differently configured attachment mechanism 91.

Figure 15:
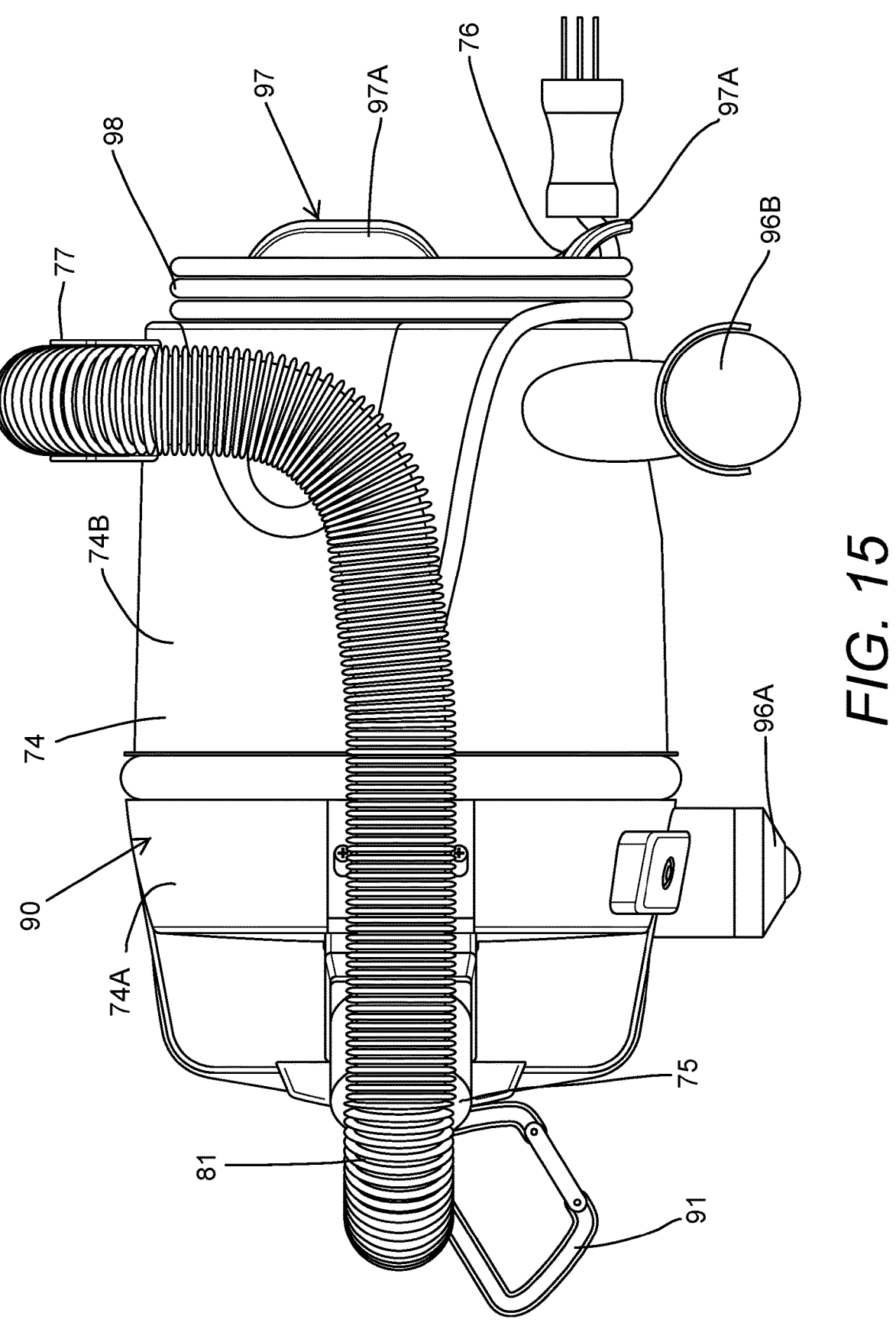
FIG. 15 is a side view of another embodiment of a pump according to aspects of the present disclosure.
Figure 16:
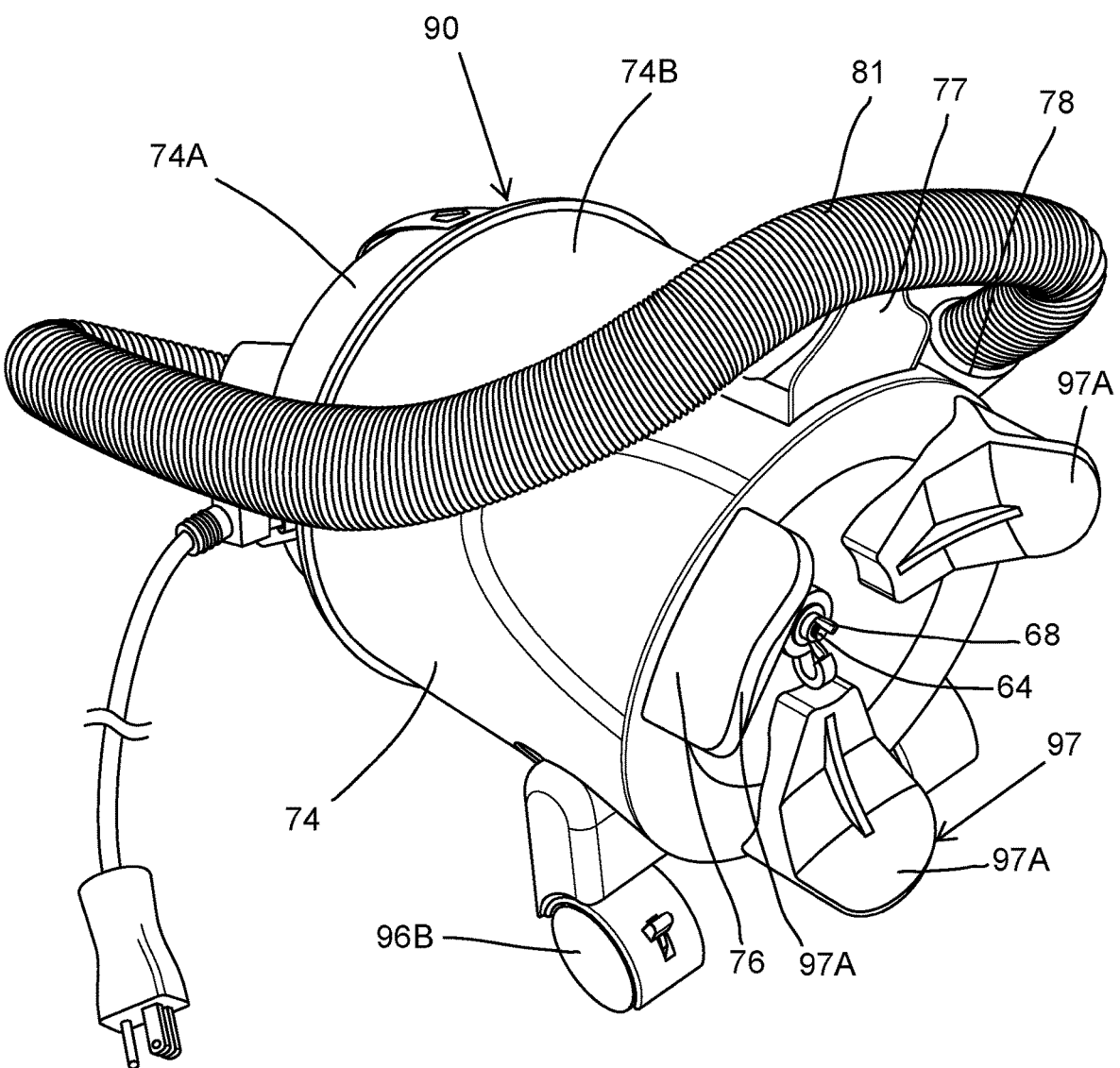
FIG. 16 is a rear perspective view of the pump of FIG. 15.

Another embodiment of the pump 90 is shown in FIGS. 4-5 and 10-11 and includes a housing 74 with an air output hose 81 connected to the pump 90 at a connection point 75 at one end of the housing 74. In this embodiment, the pump 90 is configured for sitting on the floor or other surface in multiple different configurations. The housing 74 in this embodiment is generally cylindrical and elongated along the axial dimension. The pump 90 in FIGS. 4-5 includes wheels 96 for mobility, and the wheels 96 are placed along the longest (i.e., axial) dimension of the pump 90, such that the pump 90 is configured to sit in a low-profile configuration when sitting on the wheels 96. This low-profile configuration may permit the pump 90 to sit under the bed 12 and out of the way when not in use. The pump 90 in FIGS. 4-5 has three wheels 96 positioned in a triangular pattern, with two wheels 96 positioned near the end of the pump 90 opposite the connection of the air output hose 81 and a third wheel 96 positioned more proximate to the air output hose 81. In one embodiment, the two rear wheels 96 may have fixed mounts while the front wheel 96 has a rotating mount to provide rolling in any desired direction. In other embodiments, all wheels 96 may have rotating mounts or the pump 90 may have a different type and/or number of wheels 96. In an additional embodiment, one or more wheels 96 of the pump 90 may be in the form of a caster or other structure configured for universal rotation. FIGS. 15-16 illustrate one embodiment where the front wheel 96A is in the form of a caster, with the rear wheels 96B configured similarly to the wheels 96 of the embodiment in FIGS. 4-5. Further, some or all of the wheels 96 may have manually actuated rolling locks to selectively prevent the wheels 96 from rolling and thereby resist unintentional movement of the pump 90.

The pump 90 also includes a standing base 97 configured to support the pump 90 in a standing configuration so that the wheels 96 do not contact the ground and the pump 90 does not move freely. In one embodiment, the base 97 may have a bottom surface that is shaped to generally define a plane, providing a stable resting surface. The base 97 in the embodiment of FIGS. 4-5 has a generally flat circular shape. The base 97 may also be configured to provide a structure around which the power cord 98 may be wrapped, as shown in FIGS. 4-5 and 10-11. The base 97 is located at the rear end of the housing 74 in the embodiment shown in FIGS. 4-5 and 10-11. Additionally, the base 97 in this embodiment is a relatively flat plate-shaped member that is connected to the rear end of the housing 74 by a base mount 76 that spaces the base 97 from the rear end of the housing 74. The base mount 76 as illustrated in FIGS. 4-5 and 10-11 has a smaller peripheral dimension (e.g., a smaller width and/or diameter) than the base 97 and the rear end of the housing 74 in a plane normal to the axial direction of the housing 74. This configuration allows the base mount 76 to provide a structure for wrapping the power cord 98, such that the wrapped power cord 98 is supported between the base 97 and the rear end of the housing 74, resisting uncoiling of the wrapped power cord 98. In other embodiments, the base 97 and/or the base mount 76 may have a different configuration. For example, the base 97 may not be configured as a flat plate, but rather, may include a more discontinuous structure, such as a plurality of legs. In the embodiment of FIGS. 15-16, the pump 90 has a base 97 formed by a plurality of legs 97A, and the ends of the legs 97A may be considered to define a plane for resting on a surface. The legs 97A also define the base mount 76, and the legs 97A curve radially outwardly so that the base mount 76 is configured to permit the cord 98 to be securely wrapped as described above. The pump 90 in FIGS. 15-16 has three legs 97A, but a different number of legs may be used in other embodiments.

Figure 13:
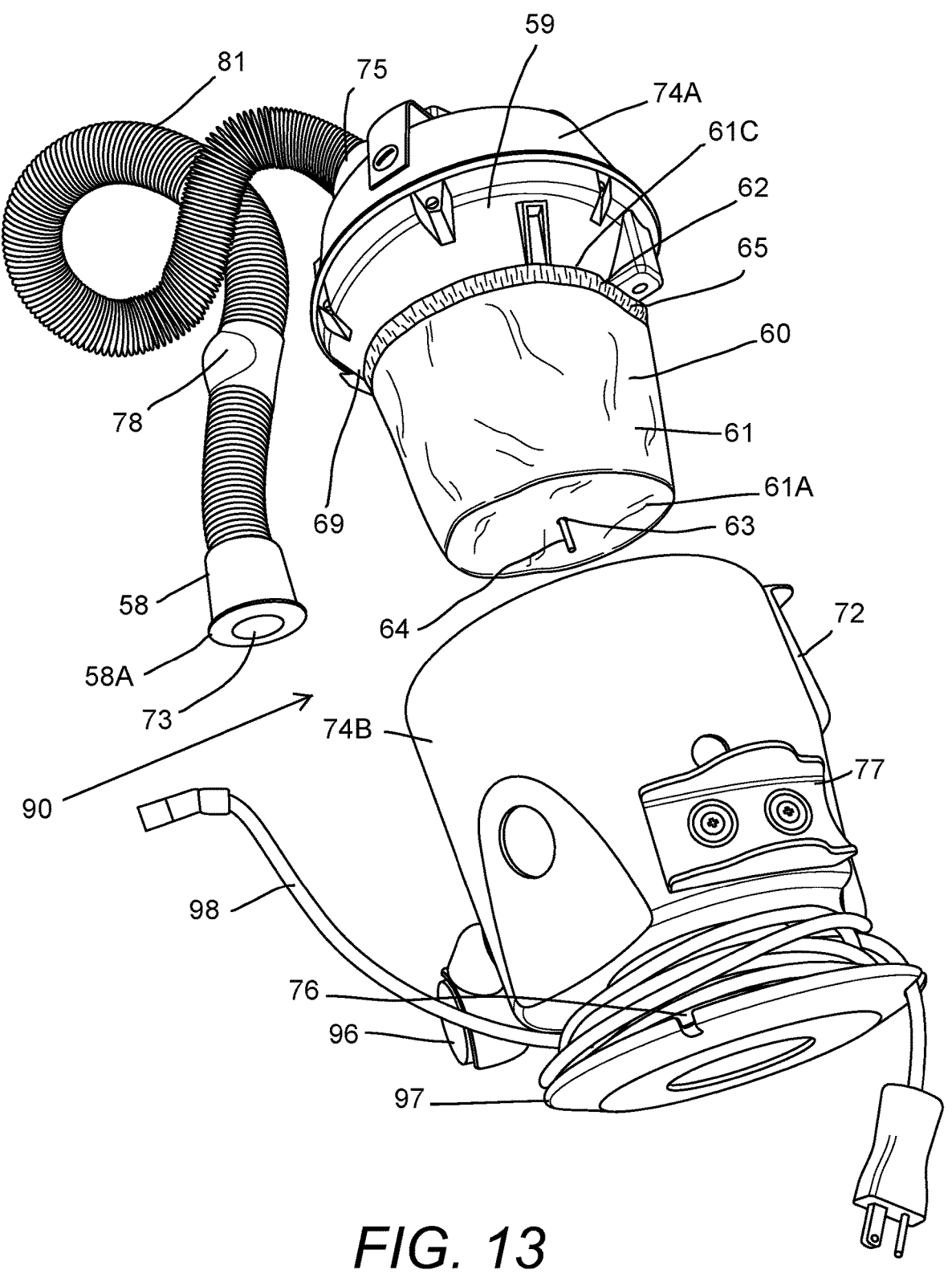
FIG. 13 is an exploded view of the pump of FIG. 4 including the filter of FIG. 12.

The pump 90 may further include a structure for holding for holding and/or retaining the air output hose 81 when not in use. For example, in the embodiment shown in FIG. 4, the pump 90 includes a strap 99 connected to the housing 74 for this purpose, and this strap 99 may also be configured to function as an attachment mechanism 91 for attachment to a structure 92, such as the bed 12. In another embodiment, the pump 90 may additionally or alternately include a clip 72 or other form of attachment that can be used to hold the air output hose 81 in place. FIG. 13 illustrates a clip 72 mounted on the housing 74 that is configured to be releasably connected to the end portion 58 of the air output hose 81 to hold the air output hose 81 in place when not in use. This clip 72 or attachment may be magnetic, so as to hold the air output hose 81 in place by attraction to a metal wire or other metallic material used in the air output hose 81. FIG. 18 illustrates a potential configuration where the clip 72 and the end portion 58 of the air output hose 81 include complementary magnetic components 72A that can retain the end portion 58 of the air output hose 81 to the clip 72 using magnetic attraction. In other embodiments, the clip 72 may additionally or alternately include a different type of retaining structure, such as a friction-based retaining structure that holds the air output hose 81 in place by frictional engagement, or another mechanical retaining structure that may hold the air output hose 81 in place by other mechanical engagement (e.g., resilient members, releasable lock, etc.). For example, the embodiment illustrated in FIG. 17 has a clip 72 that has a slot 57 receiving a portion of the flange 58A of the end portion 58 of the air output hose 81 to hold the hose 81 in place by frictional engagement.

Figure 17:
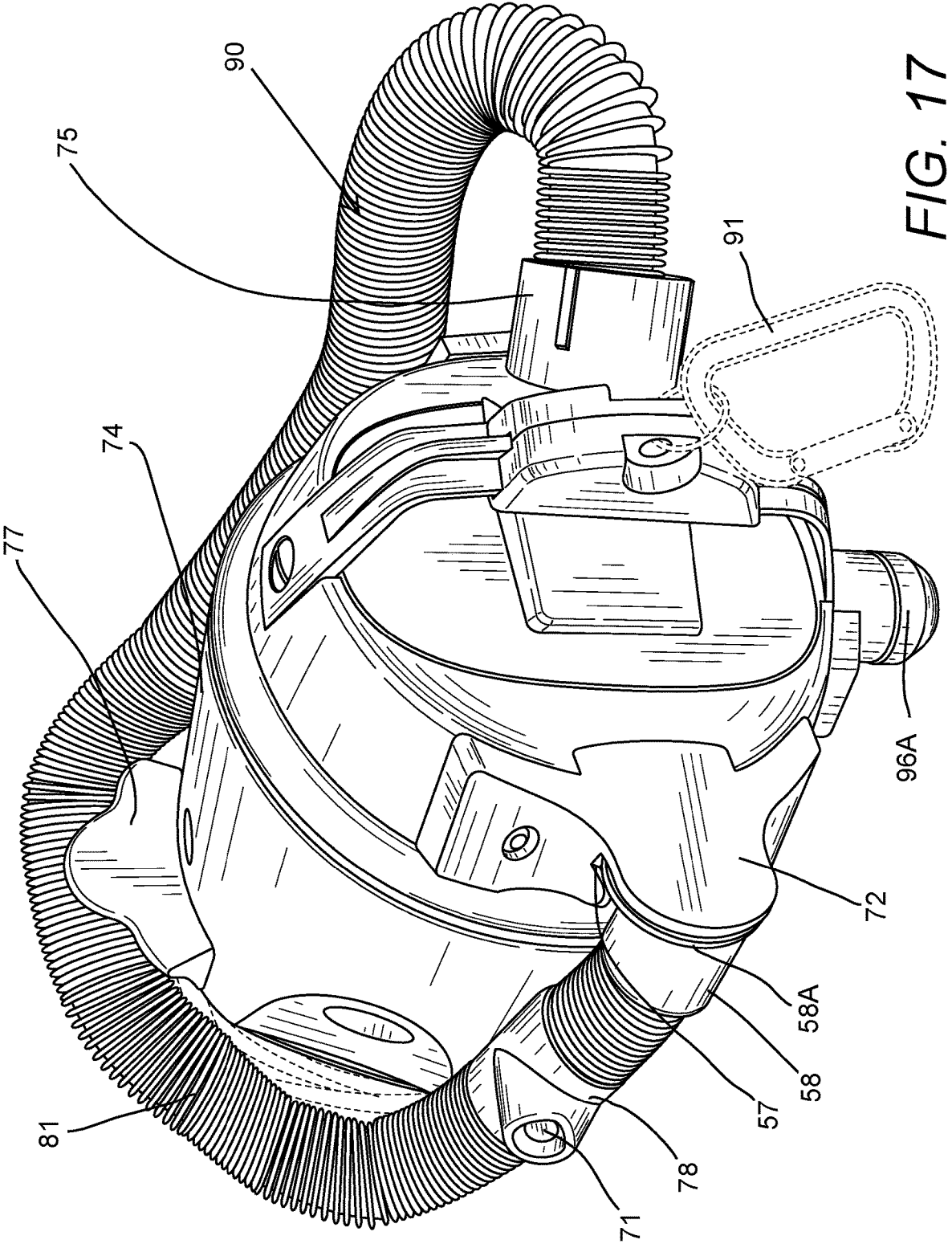
FIG. 17 is a front perspective view of the pump of FIG. 15.
Figure 18:
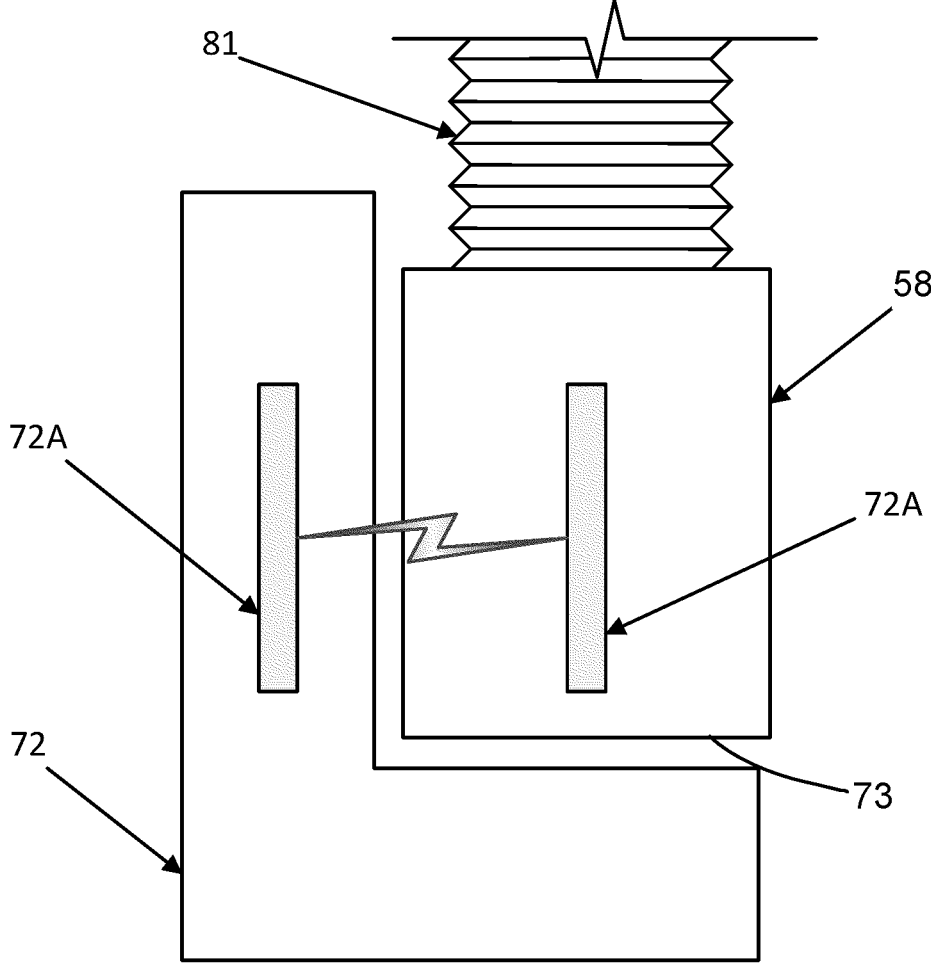
FIG. 18 is a schematic illustration of a clip and an end of an air output hose of another embodiment of a pump according to aspects of the present disclosure.

One embodiment of the pump 90 may also have a rest 77 for the air output hose 81, as illustrated in FIGS. 13 and 17. The rest 77 has a saddle-like configuration in the illustrated embodiment. The rest 77 is connected to the housing 74 at a position between the clip 72 and the connection of the air output hose 81 to the pump 90, so that part of the loose middle section of the air output hose 81 is supported by the rest 77. The rest 77 may have no retaining structure in one embodiment, or the rest 77 may have a retaining structure as described above in another embodiment (e.g., an interlocking structure and/or magnetic retention structure). In further embodiments, the pump 90 may include retaining structures configured to engage and retain portions of the air output hose 81 that may be configured and/or positioned differently.

It is understood that in other embodiments, the pump 90 may include a combination of features of any of the embodiments in FIGS. 4-6 and 10-16 as described herein. For example, in other embodiments, the pump 90 of FIGS. 4-5 may include an attachment mechanism 91, such as a carabiner clip (e.g., as in FIG. 15) or an attachment mechanism 91 configured as in the embodiment of FIG. 6, or the pump 90 of FIG. 6 may include wheels 96 or a standing base 97 as in the embodiment of FIGS. 4-5. As another example, the pump 90 may include one or more switches 71 for powering the pump 90 on/off and potentially other controls as well. Such a switch or switches may include one or more hardwired switches and/or wireless/remote switches (e.g., an RF switch).

The pump 90 (and the pumping mechanism thereof) may be activated, deactivated, and/or otherwise controlled by a control interface that may include a power switch or other switch 71 mounted and/or located on the air output hose 81 in one embodiment, as stated above. As shown in the examples in FIGS. 10-11, the switch 71 (e.g., a power switch) may be located on the air output hose 81 at or near the distal or output end 73 of the air output 81 in one embodiment, e.g., the point at which the air output 81 may be attached to port 80. For example, if the air output 81 is configured as a hose or other elongated conduit, the switch 71 may be located less than 50% of the length of the output hose 81 from the distal end 73 (i.e., more proximate to the distal end 73 than to the opposite end of the hose 81 that is connected to the housing 74), or less than 25% of the length of the output hose 81 from the distal end 73, in various embodiments. As another example, the power switch 71 may be located within 12 inches of the distal end 73, in one embodiment. The position or location of the switch 71 for purposes of these measurements may be considered to be the geometric center of the actuator of the switch 71 (i.e., the component that is configured for manual interaction and/or manipulation). The length of the air output hose 81 for this purpose may be considered to be the exposed length of the air output hose 81 in use, i.e., measured from the distal end 73 to the connection point 75 where the air output hose 81 meets the housing 74 in the embodiment of FIGS. 10-11.

Figure 10:
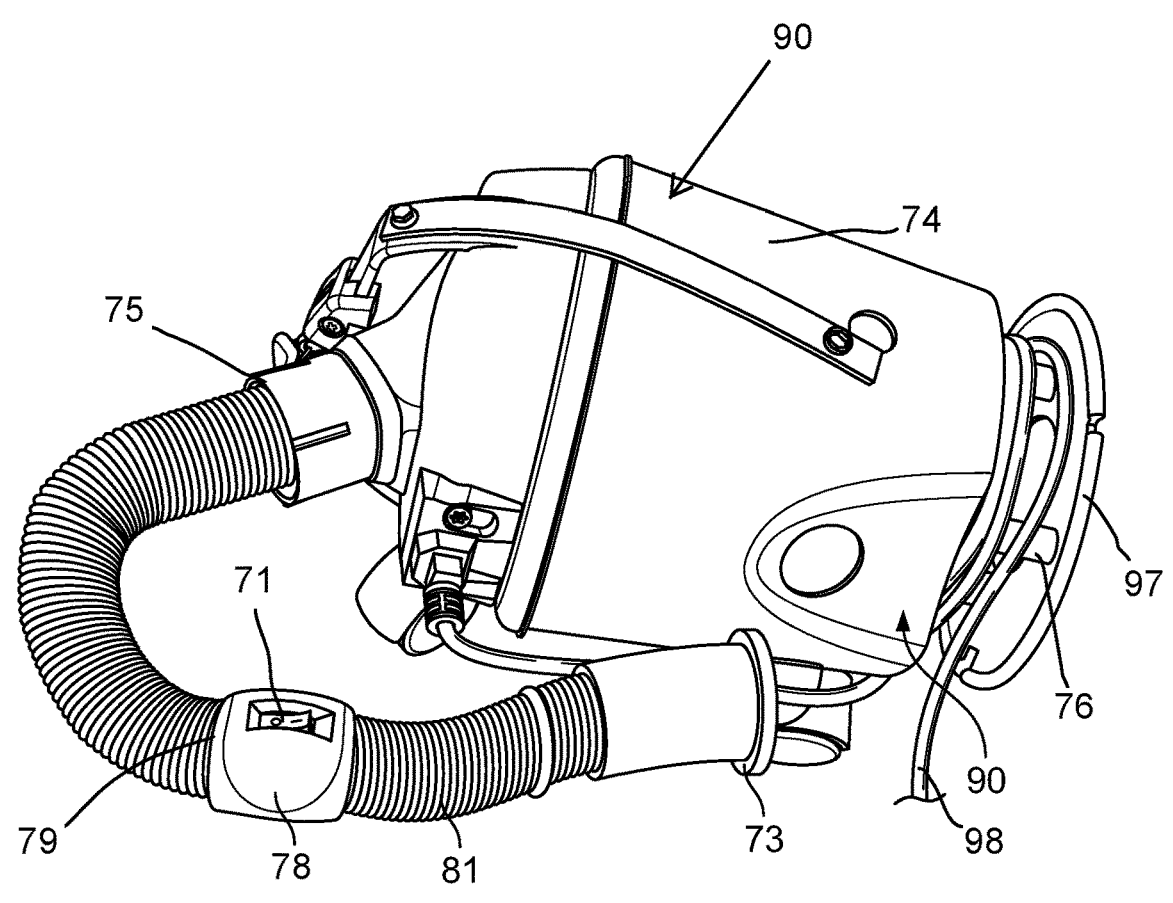
FIG. 10 is a side view of the pump of FIG. 4, including a power switch in the form of a rocker switch, according to aspects of the present disclosure.
Figure 11:
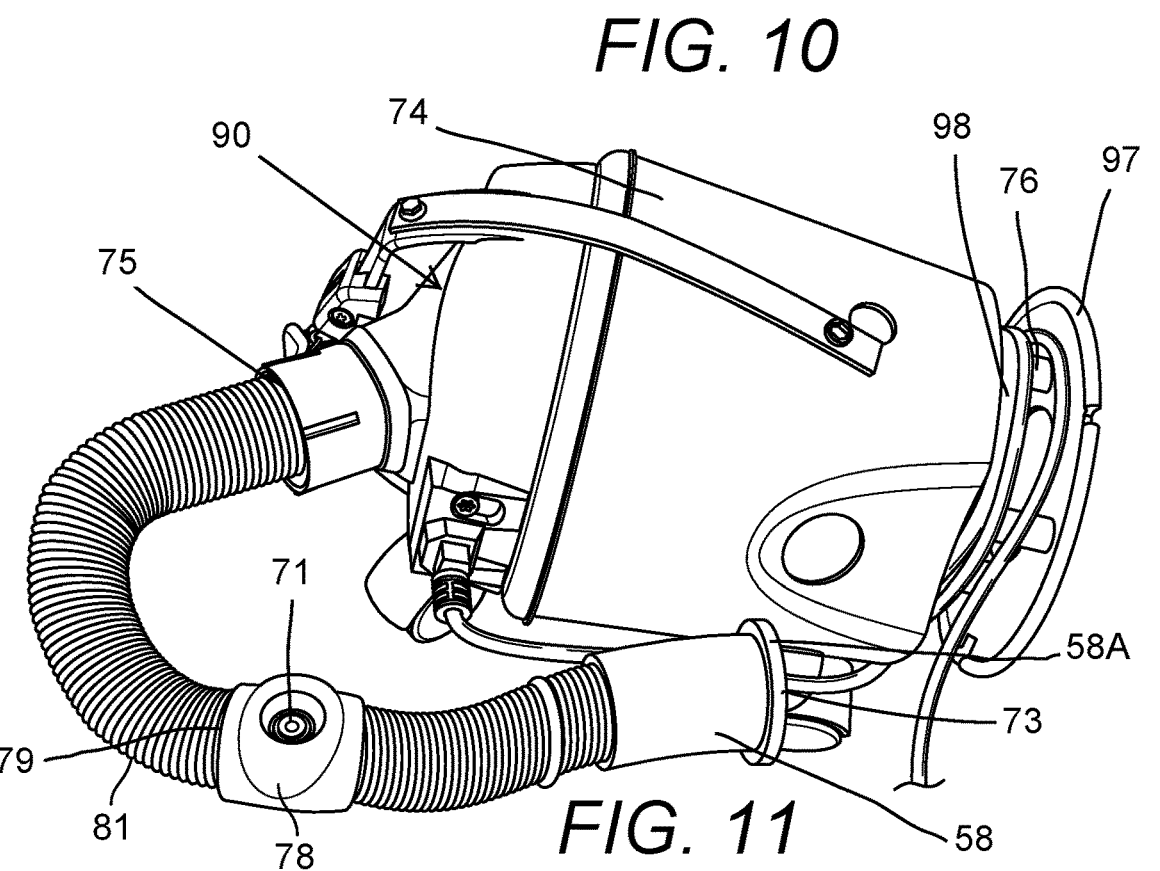
FIG. 11 is a side view of the pump of FIG. 4, including a power switch in the form of a push-button switch, according to aspects of the present disclosure.

The switch 71 may be one of several types of switches generally known to those skilled in the art, having various types of actuator structures including a toggle switch, a rocker switch (as shown in FIG. 10), a push-button switch (as shown in FIG. 11), a rotary switch, a slide switch, or other types of switches. The switch 71 may include a frame or casing 78 connected to the output hose 81 that supports the switch 71, as shown in FIGS. 10-11. The casing 78 in each of these embodiments has an open central passage 79 such that air flowing through the output hose 81 passes through the casing 78. In one embodiment, the output hose 81 may be connected to the casing 78 at opposite ends of the casing 78, and in another embodiment, the output hose 81 may pass through the passage 79 of the casing 78. The casing 78 may be positioned relative to the distal end 73 of the output hose 81 according to the relative positioning described above (e.g., less than 50% or less than 25% of the length of the output hose 81 from the distal end 73 or within 12 inches of the distal end 73). In one embodiment, at least some portion of the casing 78 may be located within the relative distances from the distal end 73 described herein. In another embodiment, the midpoint of the length of the casing 78 may be located within such relative distances of the distal end 73. In a further embodiment, the entire casing 78 may be located according to such relative positioning within such relative distances of the distal end 73.

Figure 19:
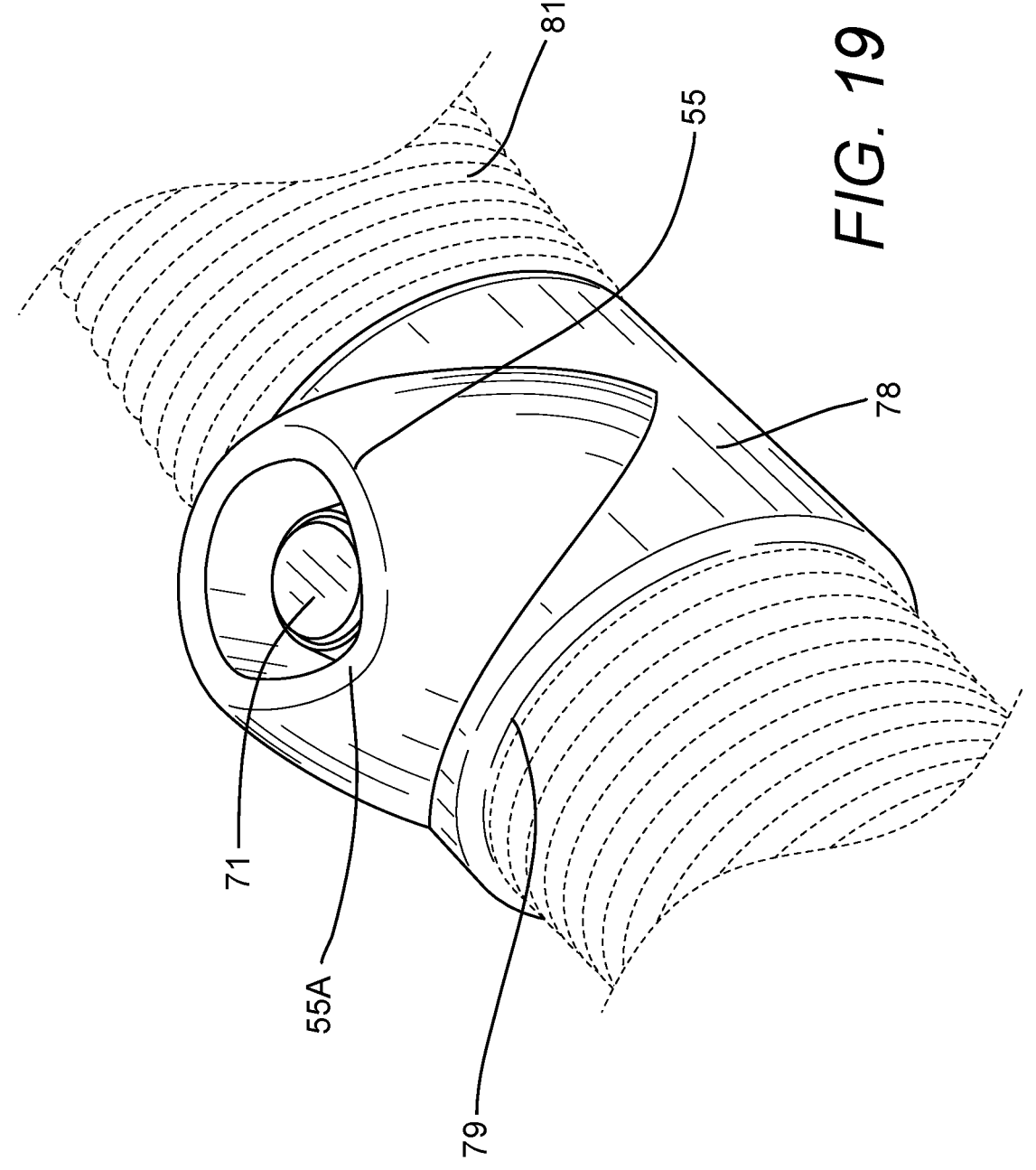
FIG. 19 is a focused perspective view of a switch of the pump of FIGS. 13-18.

The casing 78 may further include features to avoid unintentional activation of the switch 71 and/or assist with desired activation of the switch 71. FIG. 19 shows the casing 78 and the switch 71 of the pump 90 of FIGS. 15-17 in greater detail. In this embodiment, the casing 78 has a raised lip 55 surrounding the switch 71, such that the switch 71 is recessed from the top of the lip 55. This recession of the switch 71 can protect the switch 71 against unintentional activation, such as may occur by the switch 71 being bumped against the caregiver, the patient, the bed 12, etc. The switch 71 may be recessed at least 5 mm or recessed 6-7 mm from the top of the lip 55 in one embodiment. The lip 55 as shown in FIG. 19 also has a recess 55A on one side that is recessed with respect to the adjacent portions of the lip 55 and/or with respect to the entire remainder of the lip 55. The height of the switch 71 is closer to the height of the recess 55A relative to other portions of the lip 55, and in one embodiment, the switch 71 may be recessed 2 mm or less or recessed between 1-2 mm from the lowermost portion of the recess 55A. It is understood that a push-button switch 71 as shown in FIG. 19 may be depressed during use, such that vertical position of the switch 71 changes during operation, e.g., the switch may "pop up" when active or inactive. For a switch 71 as shown in FIG. 19 or other switch that moves or changes in vertical position, the degrees of recess identified above are specified with respect to the uppermost position of the switch 71, i.e., closest to the lip 55. In the embodiment shown in FIG. 11, the lip 55 generally has a frusto-conical shape, and the recess 55A has a curved trough shape, although other configurations may be provided in other embodiments to accomplish similar functions.

Figure 27:
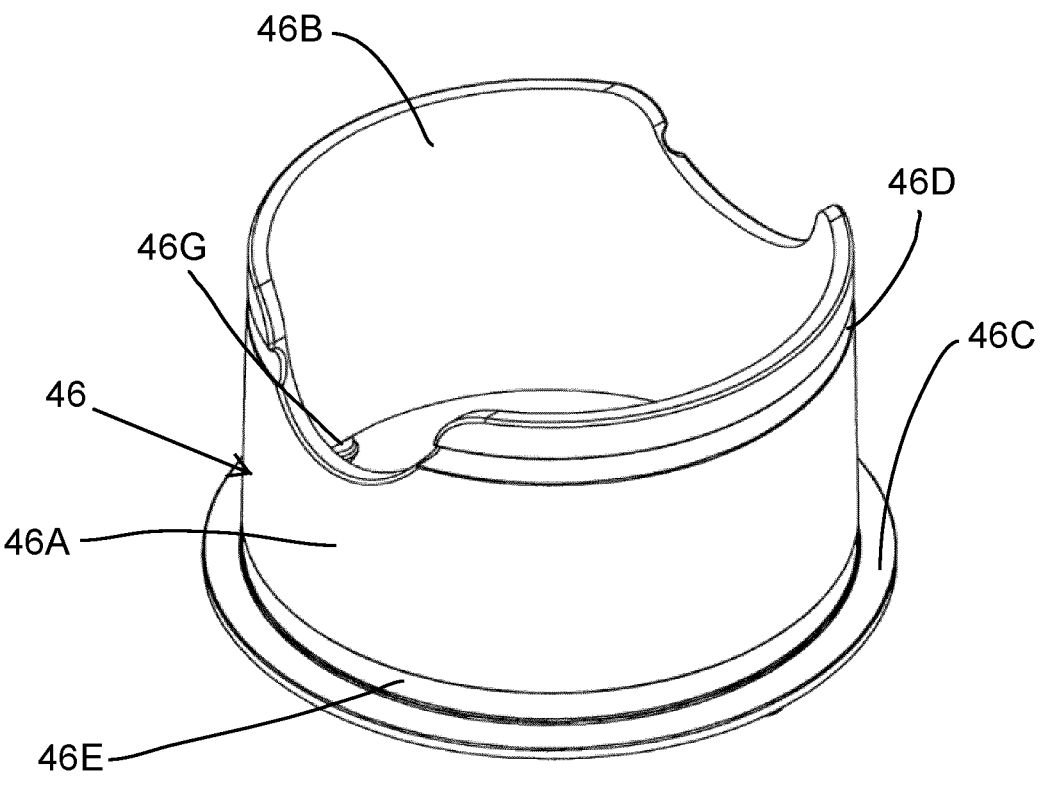
FIG. 27 is a perspective view of another embodiment of a mount for a hose cover for covering an air output hose according to aspects of the present disclosure.
Figure 28:
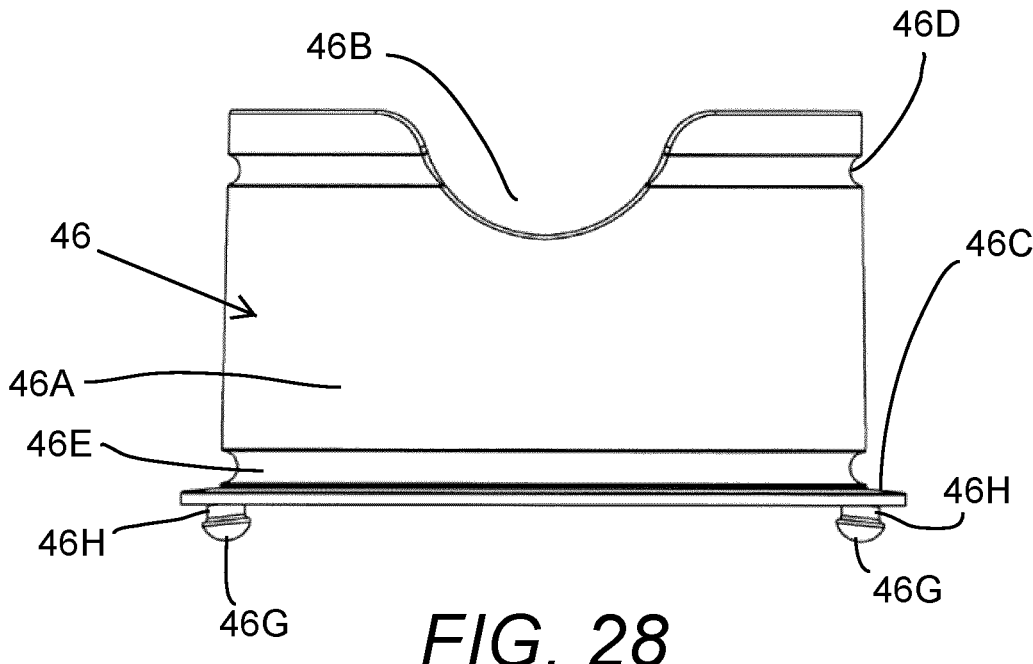
FIG. 28 is a front view of the mount of FIG. 27.
Figure 29:
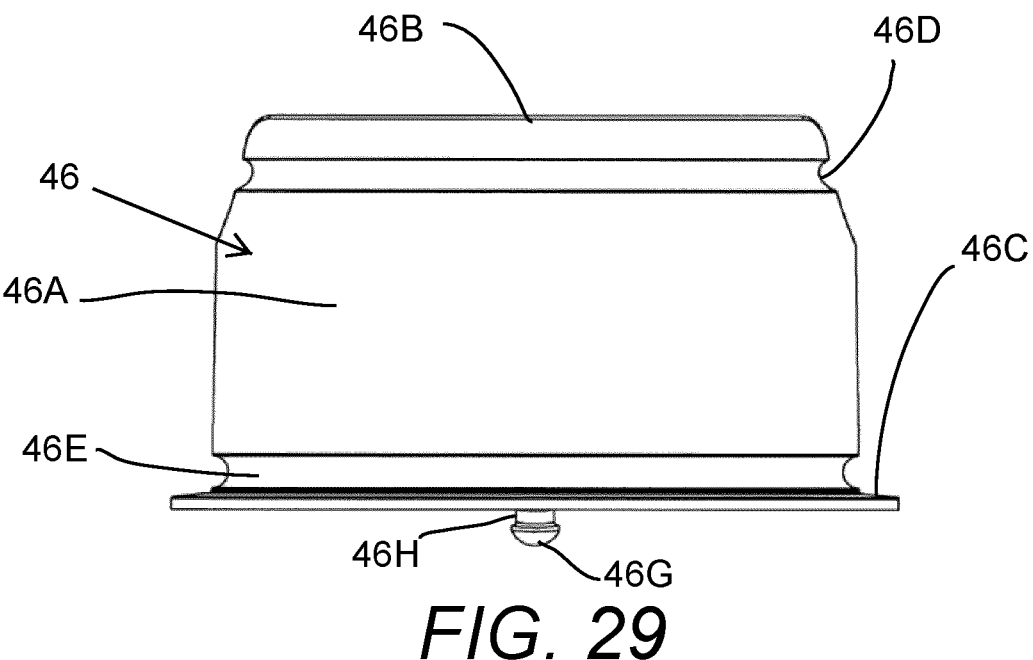
FIG. 29 is a side view of the mount of FIG. 27.

The pump 90 may be provided with a removable hose cover 44 in one embodiment, where the hose cover 44 includes a mount 46 that holds the sleeve 45 and facilitates installation of the sleeve 45. FIGS. 20-24 illustrate one embodiment of a hose cover 44, and FIGS. 27-29 illustrate an additional embodiment of a mount 46 for a hose cover 44. It is understood that the mount 46 of FIGS. 27-29 may include features and components that are structurally and/or functionally similar to features and components described herein with respect to FIGS. 20-24, and that such similar features and components may not be separately described with respect to FIGS. 27-29 for the sake of brevity. It is also understood that any features or components of the embodiment of FIGS. 20-24 may be used in connection with the embodiment of FIGS. 27-29, and vice-versa. The hose cover 44 in the embodiment of FIGS. 20-24 includes at least a sleeve 45 that can be used to surround and cover the air output hose 81. The hose cover 44 in FIGS. 20-24 also includes a mount 46 that holds the sleeve 45 and facilitates installation of the sleeve 45 and a connector 47 to connect the sleeve 45 to the air output hose 81. The sleeve 45 may be any flexible material with suitable resistance to ingress of contaminants, such as a blown plastic film sleeve in one embodiment. The connector 47 in the embodiment of FIGS. 20-24 is an elastic ring, which may be made of rubber or other elastic material or may otherwise possess elastic properties, such as having a spring structure. The connector 47 may be connected to the sleeve 45 in a variety of different manners, such as being rolled within the end of the sleeve 45. The elastic structure of the connector 47 in this embodiment permits the connector 47 to constrict around the air output hose 81 or other structure to removably connect the sleeve 45 to such structure. The connector 47 may have a different structure for releasable connection in another embodiment.

The mount 46 is generally a rigid structure that supports the sleeve 45 before installation and optionally remains connected to the sleeve 45 during and after use as well. The mount 46 is made of a relatively rigid plastic in one embodiment (which may be an FRP or composite), but may be made from other rigid or semi-rigid materials in other embodiments, including various metallic or ceramic materials. The mount 46 is formed in an annular or ring shape in the embodiment of FIGS. 20-24, with a tubular body 46A defining a central passage 46B. The tubular body 46A supports the sleeve 45 when the sleeve 45 is not installed and may further support portions of the sleeve 45 during and after installation in one embodiment. The tubular body 46A in the embodiment of FIGS. 20-24 supports the sleeve 45 by having the sleeve wrapped around the tubular body 46A and at least a portion of the tubular body 46A being received within the sleeve 45. The tubular body 46A in the embodiment of FIGS. 20-24 has a cylindrical shape over the entire length thereof, and the tubular body 46A in the embodiment of FIGS. 27-29 has a cylindrical shape with a tapered portion to ease removal of the sleeve 45 from the mount 46. The mount 46 may further include a flange 46C at or near one end of the tubular body 46A as shown in FIGS. 20-24 to ensure that the sleeve 45 is only able to be pulled off of one end of the tubular body 46A, i.e., the end distal from the flange 46C. The tubular body 46A of the mount 46 in FIGS. 20-24 further includes a retainer or retaining structure 46D that is configured to engage the connector 47 and retain the connector 47 in position on the tubular body 46A. The retaining structure 46D in the embodiment of FIGS. 20-24 is an annular recess or channel that extends at least a portion of the way around the tubular body 46A. In other embodiments, the retaining structure 46D may have a different configuration, such as a raised structure or structures, e.g., a ridge, lip, protrusion, etc. The sleeve 45 may be connected to the mount 46 at the end of the sleeve 45 opposite the connector 47, such as by adhesive, mechanical connection, etc. In one embodiment, the end of the sleeve 45 opposite the connector 47 may have a second connector (not shown), such as a second elastic ring. to connect the sleeve 45 to the tubular body 46A. The sleeve 45 may be connected proximate the flange 46C of the mount 46, and a second retaining structure 46E on the mount 46 may receive the second connector to strengthen this connection. In the embodiment of FIGS. 20-24, the second retaining structure 46E is in the form of slots on the tubular body 46A, but may take another form in other embodiments, such as a recess or channel as shown in FIGS. 27-29.

Figures 20, 21:
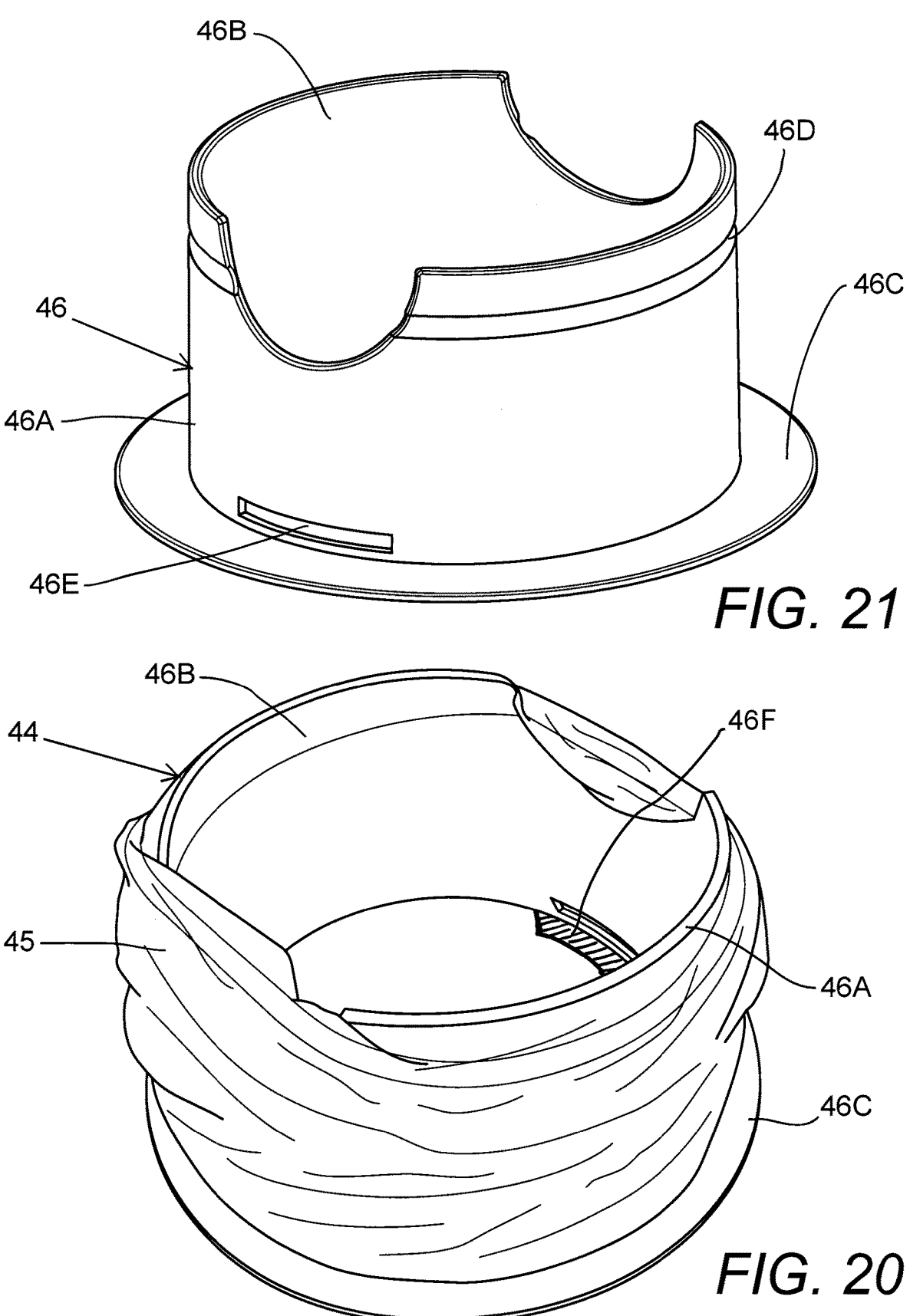
FIG. 20 is a perspective view of one embodiment of a hose cover for covering an air output hose according to aspects of the present disclosure.
FIG. 21 is a perspective view of a mount of the hose cover of FIG. 20.
Figures 22, 23:
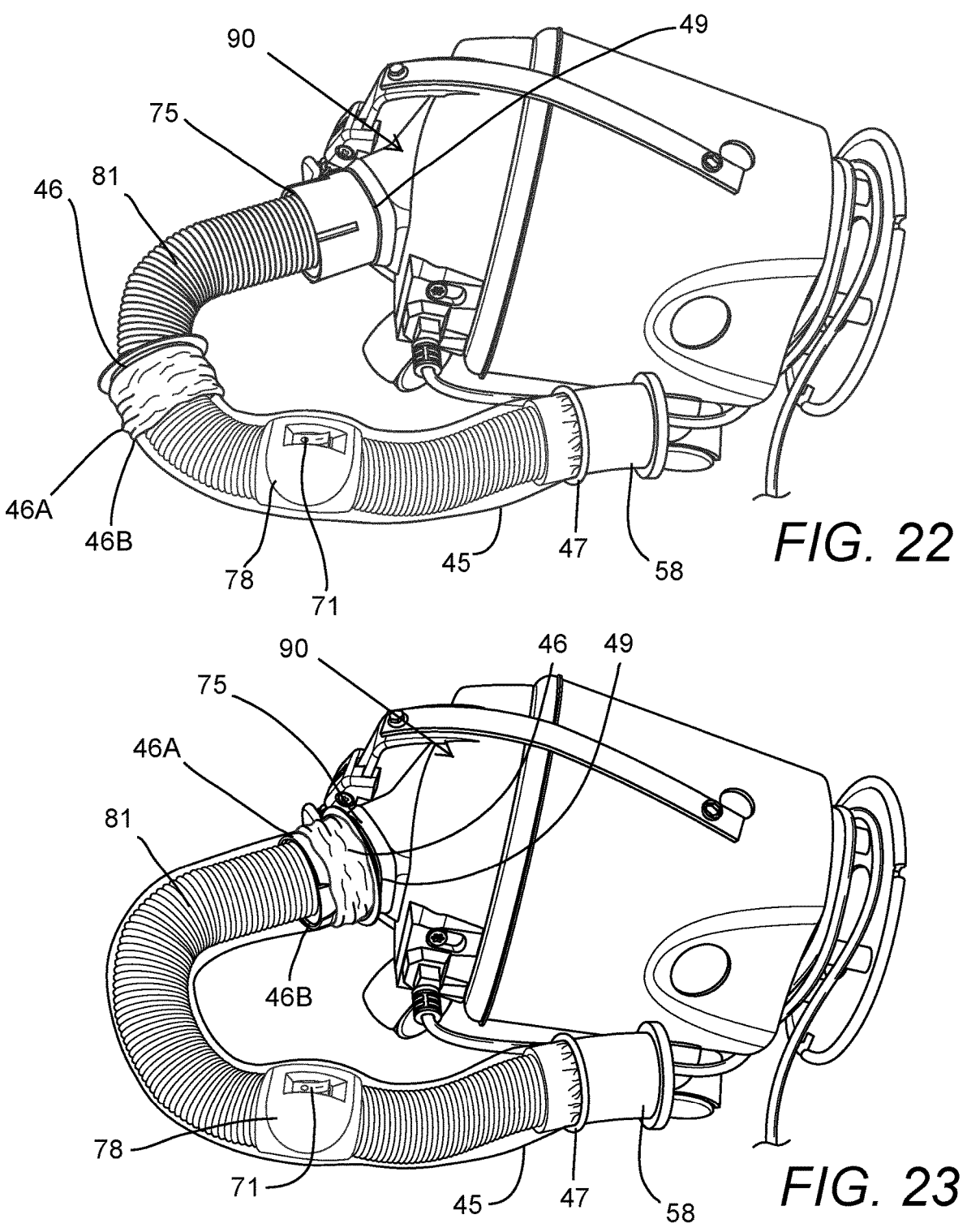
FIG. 22 is a perspective view of the pump of FIG. 10 having the hose cover of FIG. 20 being installed to cover the air output hose of the pump.
FIG. 23 is a perspective view of the pump and hose cover of FIG. 22 after the hose cover is completely installed.
Figure 24:
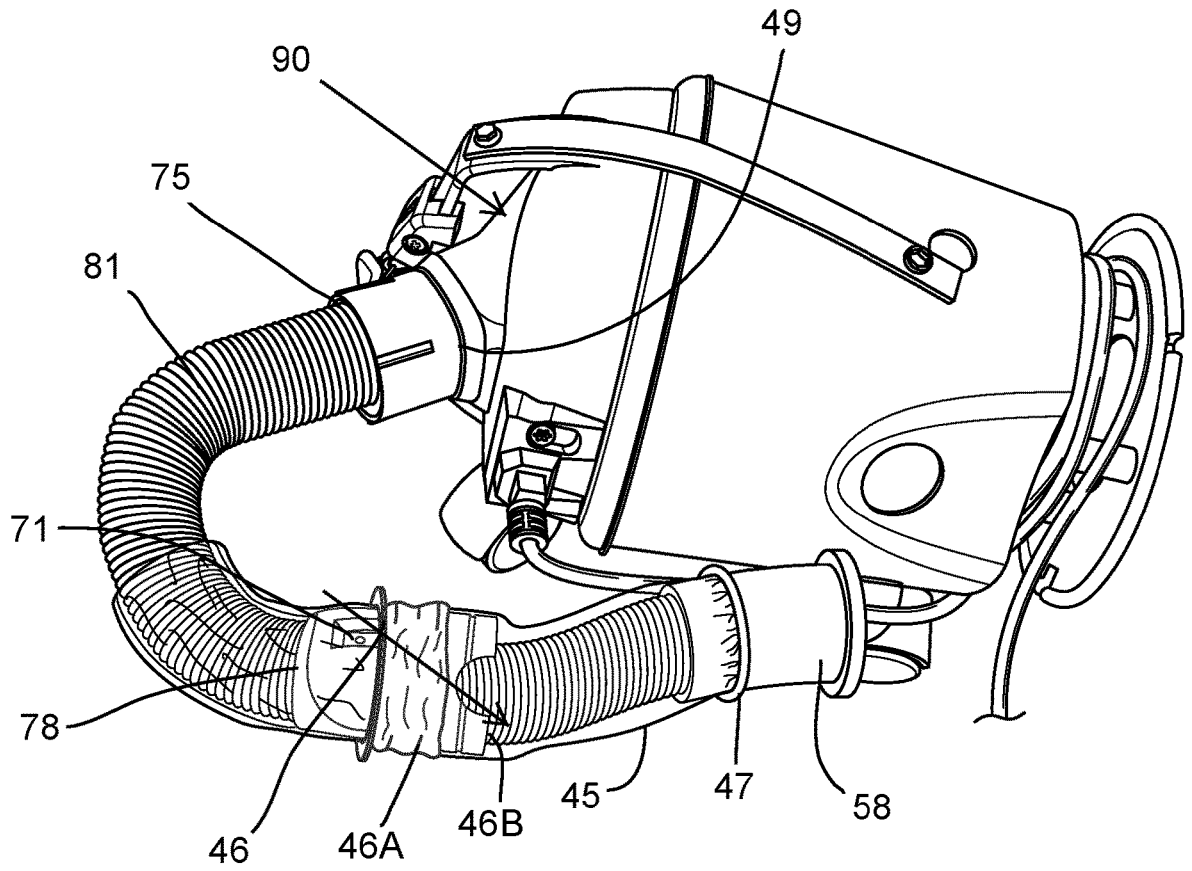
FIG. 24 is a perspective view of the pump and hose cover of FIG. 22 having the hose cover being removed from the air output hose.

One embodiment of a method for applying the hose cover 44 to cover the air output hose 81 is shown in FIGS. 22-24. This method is shown in connection with the pump 90 as shown in FIG. 10, although it is understood that the hose cover 44 may be used with any other embodiment of the pump 90 shown or described herein, or with respect to a hose on a different type of apparatus for moving air or other fluid or fluidized substance (e.g., a vacuum cleaner). The hose cover 44 may initially be provided with the sleeve 45 mounted on and supported by the mount 46 as shown in FIG. 20, such that the sleeve 45 is wrapped around the tubular body 46A, which may require rolling and/or bunching of the sleeve 45. The connector 47 engages the retaining structure 46D in this configuration by constricting around the tubular body 46A and being received within the recess of the retaining structure 46D. To apply the hose cover 44 to the air output hose 81, the end portion 58 of the air output hose 81 is inserted through the central passage 46B of the mount 46, and the connector 47 can be pushed or rolled off the end of the tubular body 46A to connect to the air output hose 81, as shown in FIG. 22. The connector 47 is constricted around the end portion 58 of the air output hose 81 in the embodiment shown in FIG. 22, and in one embodiment, the end portion 58 of the air output hose 81 may be provided with retaining structure for engaging the connector 47, similar to the retaining structure 46D of the mount 46. The mount 46 is then moved along the length of the air output hose 81 toward the pump 90, which pulls the sleeve 45 off the end of the tubular body 46A to continuously cover the air output hose 81, as also shown in FIG. 22. As shown in FIG. 22, the tubular body 46A supports any extra portions of the sleeve 45 that are not necessary to be deployed to reach the length of the air output hose 81, and the central passage 46B of the tubular body 46A forms a continuous passage with the sleeve 45 in which the air output hose 81 is received. Once the entire air output hose 81 has been covered, the mount 46 can be left in position at or around the connection point 75 of the air output hose 81, as shown in FIG. 23.

Figure 30:
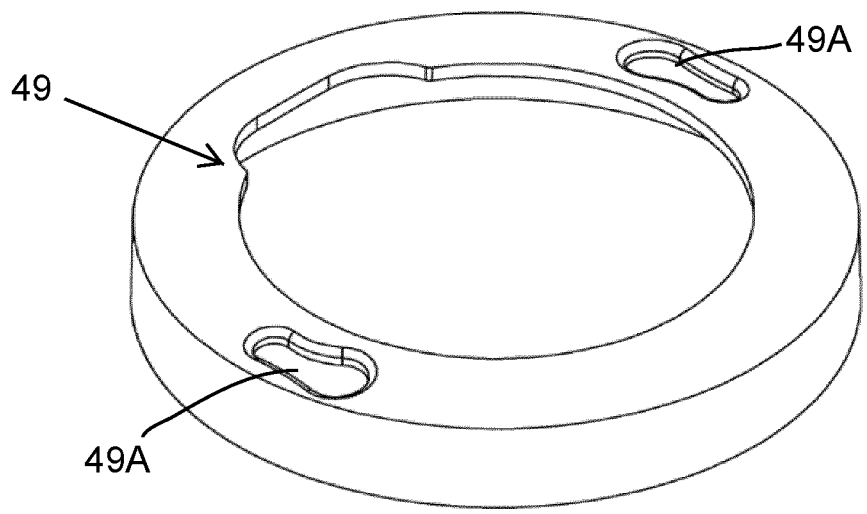
FIG. 30 is a perspective view of one embodiment of a hose inlet cover configured for use with a pump according to aspects of the present disclosure.

The mount 46 and/or the pump 90 may include releasable connecting or retaining structure for retaining the mount 46 in place at the connection point 75, and the mount 46 and the pump 90 may have complementary structures for this purpose. For example, in one embodiment, the mount 46 may have a plurality of flanges or tabs 46F as shown in FIG. 22 that allow for attachment of the mount 46 to the pump 90 by twisting or snapping into place to engage with complementary flanges or tabs (not shown) on the pump 90 (e.g., on the hose inlet cover 49 of the housing 74). As another example, the mount 46 may have a plurality of projections 46G on the underside of the flange 46C that engage with holes 49A on the pump 90 (e.g., on the hose inlet cover 49) in one embodiment, as shown in FIGS. 27-30. FIGS. 27-29 illustrate an example embodiment of a mount 46 with this feature, and FIG. 30 illustrates an example embodiment of a hose inlet cover 49 having holes 49A configured to engage with the mount 46. In this embodiment, the projections 46G may be received in the larger portions of the holes 49A, and then the mount 46 can be twisted to lock the edges of the smaller portions of the holes 49A into slots 46H on the projections 46G. It is understood that the arrangement of the holes 49A and the projections 46G may be transposed, such that one or all of the projections 46G are located on the pump 90, and one or all of the holes 49A are located on the mount 46. Further different structures can be used in further embodiments.

In another embodiment, the sleeve 45 may be installed on the air output hose 81 in a manner such that the mount 46 can be removed from the sleeve 45 and discarded and the sleeve 45 can remain installed on the air output hose 81. For example, the installation may instead begin at the connection point 75 so the sleeve 45 may be pulled toward the end portion of the air output hose 81, the air output hose 81 may be removed from the pump 90 during installation, or the mount 46 may have a gap or releasable/breakable portion to permit removal of the mount 46, among other embodiments.

The hose cover 44 as shown in FIGS. 20-24 provides a sanitary barrier to resist or prevent contaminants such as chemical and/or biological materials from coming into contact with the air output hose 81. The structure of the air output hose 81 in this embodiment makes cleaning difficult, particularly between the folds of the accordion-like structure, where contaminants such as biological waste and bodily fluids can accumulate. The hose cover 44 resists ingress of these contaminants to the surface of the air output hose 81 to avoid this problem.

The hose cover 44 can be removed by moving the mount 46 back along the air output hose 81 toward the end portion 58 until the entire sleeve 45 is pulled off of the air output hose 81, as shown in FIG. 24. During this action, the sleeve 45 is turned inside-out so that the potentially contaminated outer surface of the sleeve 45 becomes the inner surface and is not handled by the user. The sleeve 45 can then be disposed of, and a new hose cover 44 may be installed in its place. In other embodiments, the hose cover 44 may be removed using a different technique.

The hose cover 44 or various components thereof may be configured differently in other embodiments. For example, in various embodiments, the sleeve 45 may not include a connector 47 and/or a mount 46. For example, the sleeve 45 may be rolled or slid onto the air output hose 81 without the mount 46. As another example, the sleeve 45 may include innate retaining properties to retain itself in contact with the air output hose 81, such as being made of an elastic material or a material with clinging properties, e.g., adhesive or static. It is understood that the method for applying the hose cover 44 shown in FIGS. 22-24 is configured for use with a hose cover 44 having a structure as shown in FIGS. 20-24, and that a differently configured hose cover 44 may benefit from or require modifications to the method of installation.

Figure 12:
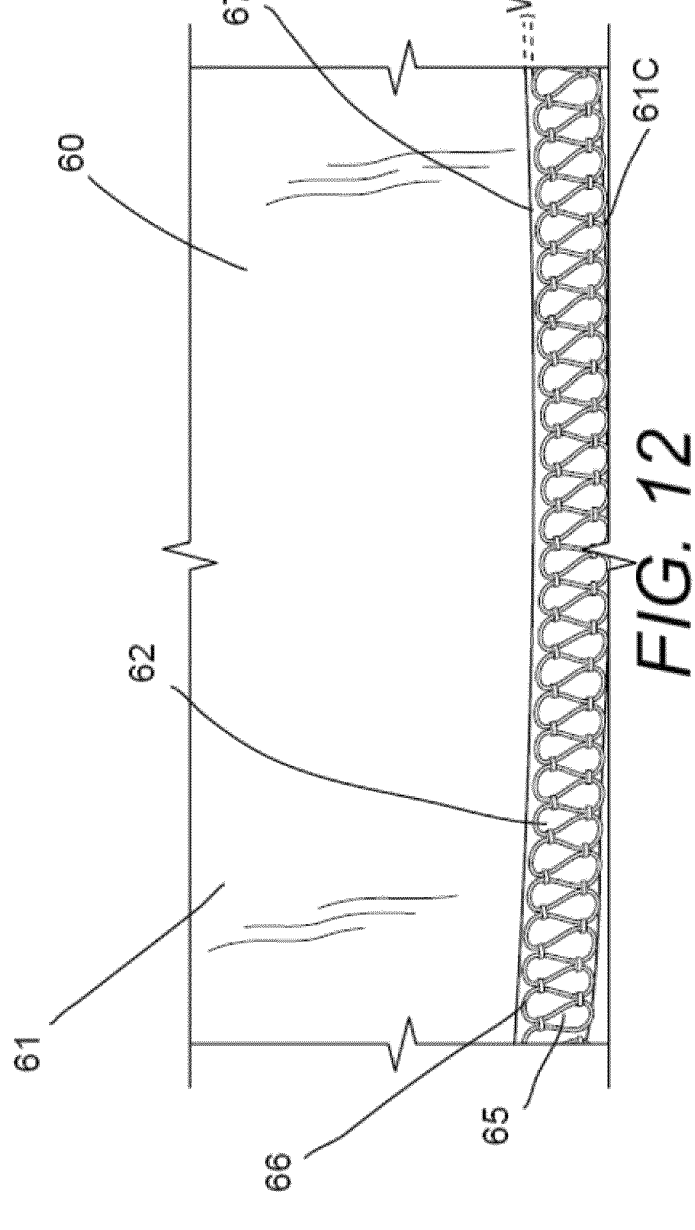
FIG. 12 is a magnified perspective view of a portion of a filter according to aspects of the present disclosure, shown inside-out, configured for use with the pump of FIG. 4.
Figure 14:
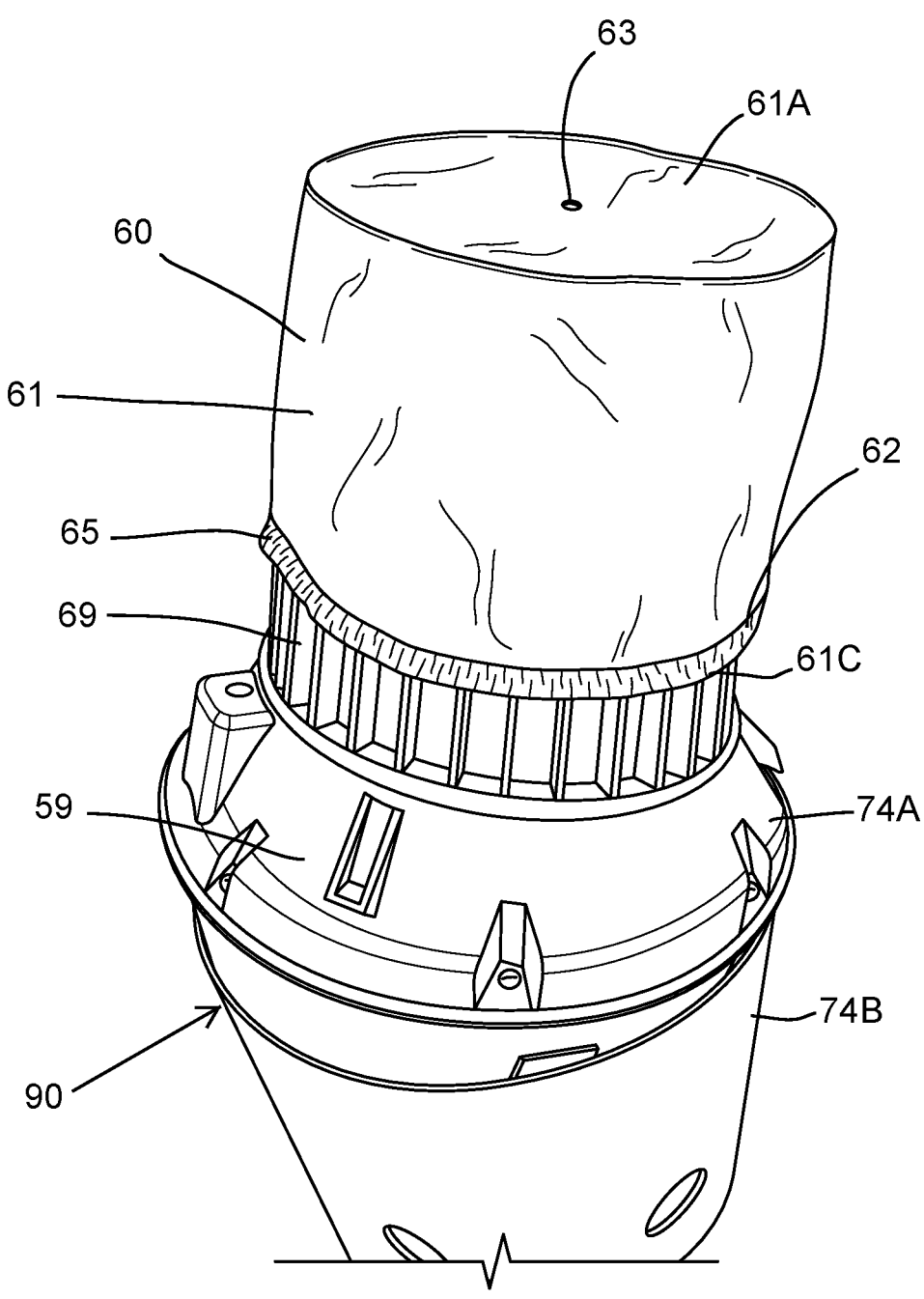
FIG. 14 is a perspective view of the pump as illustrated in FIG. 13, showing installation of the filter of FIG. 12.

The pump 90 may include an internal filter 60 that filters the air as it passes through the pump 90, before the air passes through the air output 81. FIGS. 12-14 illustrate one embodiment of a filter 60 that may be used in connection with the pump 90 of FIGS. 4-5, and FIGS. 13-14 illustrate the installation thereof. The filter 60 in this embodiment generally includes a filter body 61 made from a material configured for filtering air and an elastic retaining portion 62 connected to the filter body 61 and configured to hold the filter 60 in place within the pump 90. The filter body 61 in the embodiment of FIGS. 12-14 has a cylindrical or frusto-conical shape, with a closed end 61A and a cylindrical or conical sidewall 61B with an open end or opening 61C configured to receive a portion of the pump 90 therein. In the embodiment shown in FIGS. 13-14, the filter body 61 also has an aperture 63 configured to receive a connector 64 for assembly of the housing 74 as described below.

The retaining portion 62 in the embodiment of FIGS. 12-14 includes an elastic ring 65 positioned at or proximate the open end 61C of the filter body 61. The elastic ring 65 is connected to the filter body 61 by stitching 66 at least around the inner edge of the elastic ring 65, as shown in FIG. 12. It is understood that the filter 60 in FIG. 12 is illustrated inside-out, with the exposed surface in FIG. 12 being the inner surface in use. As illustrated in FIG. 12, the elastic ring 65 has a lip or flange 67 that hangs free and is not connected to the filter body 61. This configuration is created by defining a space between the edge of the stitching 66 and the edge of the elastic ring 65 opposite the open end 61C, thereby creating the lip 67. This lip 67 may increase the retaining ability of the retaining portion 62, such as by folding partially or completely inwardly in response to frictional forces when the filter 60 is pulled toward the closed end 61A (i.e., the direction of force necessary to remove the filter 60). This folding decreases the inner dimension (e.g., the inner diameter) of the retaining portion 62, which increases the compressive force on the elastic ring 65 and increases the resultant frictional forces, thereby resisting removal of the filter 60. The lip 67 in the embodiment of FIG. 12 has a width W measured between the extremity of the stitching 66 and the edge of the elastic ring 65, as shown in FIG. 12. In one embodiment, the average width W of the lip 67 is at least 1 mm, and may be from 1-10 mm. The In other embodiments, the embodiment in FIGS. 12-14 may include a different structure, including a different retaining portion 62 or no retaining portion 62 at all.

FIGS. 13-14 illustrate one embodiment of a method and configuration of installing the filter 60 on the pump 90. The pump 90 in FIGS. 13-14 has a multi-piece housing 74 that includes a first piece 74A that supports most or all of the electronic and mechanical components of a pumping mechanism 59, e.g., a compressor (not shown) and related components, and a second piece 74B that supports the wheels 96, the base 97, the clip 72, the rest 77, and other such components. The connection point 75 of the air output hose 81 is located on the first piece 74A in this embodiment, and it is understood that components of the pumping mechanism 59 that are not shown in FIGS. 13-14 may be contained within the first piece 74A. The pieces 74A-B may be connected together by one or more connecting structures, and in the embodiment of FIGS. 13-14, the first piece 74A has a connector 64 that is connected to the second piece 74B, such as by a threading engagement with a screw. An example of this connection is shown in FIG. 16, which shows the connector 64 extending through a hole in the second piece 74B and connected using a nut 68 in a threaded arrangement. The pieces 74A-B may include additional connecting structures, and in other embodiments of multi-piece housings, different connecting structures may be used. The pump 90 in FIGS. 13-14 includes an intake portion 69 connected to the first piece 74A, which may be configured with one or more openings (not shown) to serve as an air intake for the pump 90. As shown in FIGS. 13-14, the filter 60 is placed over the intake portion 69, such that the intake portion extends through the opening 61C and is received within the filter body 61. The first and second pieces 74A-B may be separated to permit connecting and removing the filter 60. The retaining portion 62 engages a portion of the intake portion 69 and/or the first piece 74A to retain the filter 60 in place. When the first and second pieces 74A-B are re-assembled, the intake portion 69 and the filter 60 are at least partially received within the second piece 74B, as shown in FIG. 13. It is understood that the other embodiments described herein, e.g., as shown in FIGS. 4-6, 10-11, and 15-16, may use a similarly configured housing 74, filter 60, and/or pumping mechanism 59. In other embodiments, the pump 90, the filter 60, and the corresponding connections between these components may be differently configured.

Figure 26:
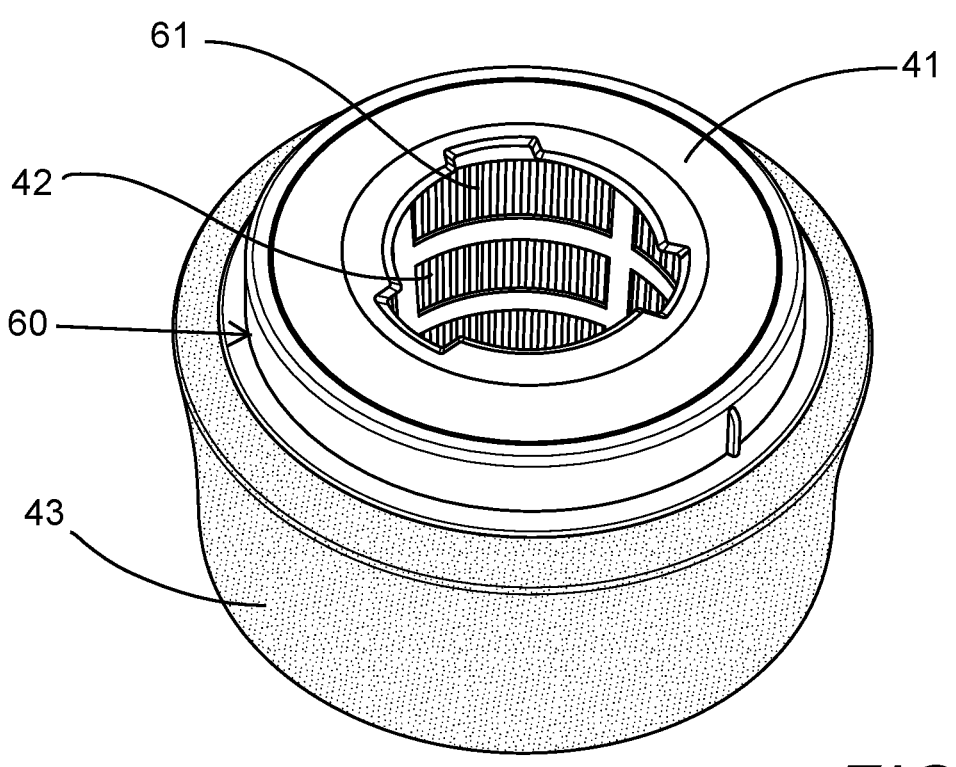
FIG. 26 is a perspective view of the HEPA filter of FIG. 25 with a dust cover connected to the HEPA filter.
Figure 25:
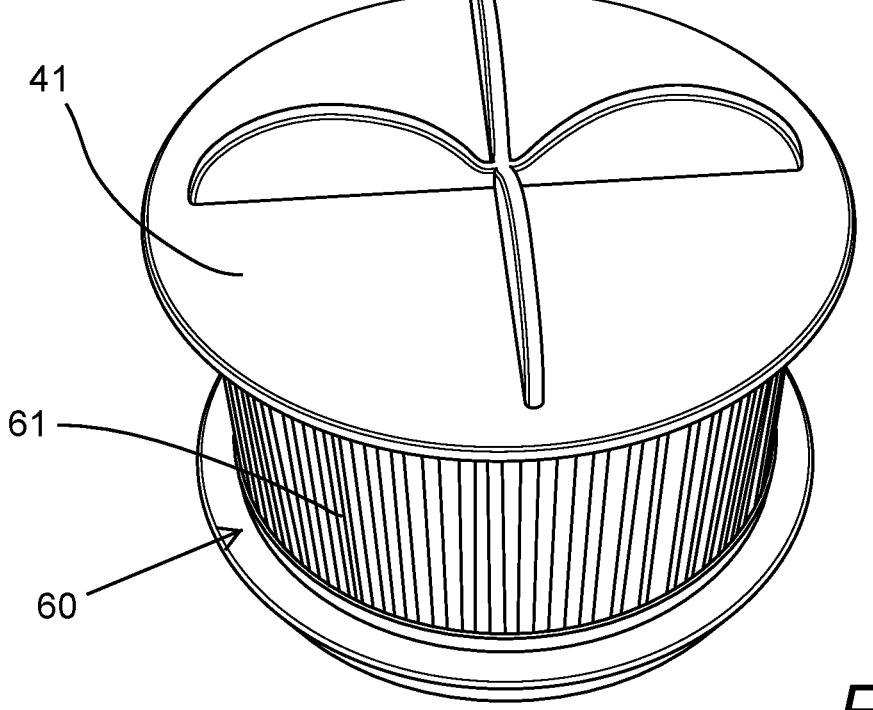
FIG. 25 is a bottom perspective view of a HEPA filter configured for use with an air output pump according to aspects of the present disclosure.

FIGS. 25-26 illustrate another configuration of the filter 60, in the form of a high efficiency particulate arresting ("HEPA") filter. The HEPA filter 60 in FIGS. 25-26 includes a base 41 that supports the filter body 61 around a central passage 42 and has structure for connecting the filter 60 to the pump 90. It is understood that the pump 90 may have corresponding or complementary structure for connection to the base 41. The HEPA filter 60 may further be provided with a removable dust cover 43 to filter out larger particles before they reach the filter body 61, as shown in FIG. 26. In this configuration, incoming air passes first through the dust cover 43 and then through the filter body 61 and into the central passage 42, then out of the central passage 42 through the air output 81. It is understood that other embodiments may use a HEPA filter 60 that is configured differently from the filter 60 shown in FIGS. 25-26.

All or some of the components of the system 10 can be provided in a kit, which may be in a pre-packaged arrangement, as described in U.S. Patent Application Publication No. 2012/0186012, published Jul. 26, 2012, which is incorporated by reference herein in its entirety and made part hereof. For example, the device 20 (deflated), the pad 40, the one or more wedges 50 and/or the pump 90 may be provided together in a single package or multiple packages.

An example embodiment of a method for utilizing the system 10 is illustrated in part in FIGS. 1-3 and 7-9. Once the device 20 and the pad 40 are placed beneath the patient 70, the device 20 can be inflated, by connecting the air output 81 to one of the inflation ports 80 and then fastening the retaining mechanism 83 to secure the connection. Air can then be pumped into the device 20 through the air output 81. Deflation can be accomplished by simply shutting off and/or removing the air output 81. The wedges 50A-B may be at least partially inserted beneath the device 20 and the patient 70 to place the patient 70 in an angled position. It is understood that the wedges 50A-B may be used in connection with the device 20 when the device 20 is in the inflated or non-inflated state. The inflation of the device 20 provides support for the patient 70, and the air flowing through the passages 37 reduces friction between the device 20 and the supporting surface 16, in order to ease movement of the patient 70.

The use of the pump 90 described herein provides benefits and advantages over existing technology when used alone and when used in connection with a system 10 for supporting, turning, and moving a patient, as described herein. For example, the low profile of the pump 90 permits it to be stored under a bed 12 or elsewhere out of the way when in use or in storage. This increases the safety of use of the pump in a patient care setting, such as with a system 10 as described herein, so that the pump 90 can be positioned in a location that will not interfere with the patient 70 and/or caregivers. Other features enhance the safety and ease of use in such a setting as well, such as the attachment mechanism 91, mechanisms for holding the output hose 81 in place, multiple switches (including potentially a remote switch) for controlling the pump 90, etc. The base 97 provides a stable surface for resting the pump in an immobile configuration, as well as a convenient structure for wrapping the power cord when not in use. The combination of the base 97 and the wheels 96 provide for use in a mobile or immobile configuration. Further, the use of the switch 71 proximate the distal end 73 of the output hose 81 provides the caregiver the ability to maintain attention on the patient and to keep his/her hands on or near the patient while activating or deactivating the pump 90, which increases safety and quality of patient care. Still further, the degree of recession of the switch 71 from the adjacent surfaces of the casing 78 is large enough to avoid accidental activation of the switch 71, while small enough to permit easy operation of the switch 71 when desired. The use of the recess 55A in the lip 55 surrounding the switch 71 assists with this operation, and this configuration enhances both functionality and safety of the switch 71. Various additional features enhance the convenience and functionality of the pump 90. Still other benefits and advantages over existing technology are provided by the systems, apparatuses, and methods described herein, and those skilled in the art will recognize such benefits and advantages. It is understood that the features of the pump 90 may provide benefits in other settings and applications as well, and not only when used in a patient care setting.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A pump apparatus comprising:
a pump configured for moving air;
a housing supporting the pump, the housing having a top portion, a base portion, and a sidewall extending between the top portion and the base portion;
a handle removably coupled to the top portion, the handle separated from the sidewall and the base portion by the top portion;
an air outlet positioned on the top portion;
an air output hose coupled to the air outlet; and
a rest configured for retaining a portion of the air output hose;
wherein the pump is configured to move air to the air outlet.

2. The pump apparatus of claim 1, wherein the sidewall surrounds the pump and the pump is located below the air outlet.

3. The pump apparatus of claim 1, wherein the top portion includes an uppermost exterior surface of the housing and the base portion includes a lowermost exterior surface of the housing.

4. The pump apparatus of claim 1, wherein the housing defines a chamber of the pump, and wherein the rest retains the portion of the air output hose along the housing.

5. The pump apparatus of claim 1, wherein the rest further includes a retaining structure for retaining a portion of the air output hose, the retaining structure is a mechanical feature or the retaining structure is magnetic.

6. The pump apparatus of claim 1, further comprising a switch mounted on the air output hose and located along a length of the air output hose, wherein the switch is configured for controlling operation of the pump.

7. The pump apparatus of claim 6, wherein the switch is located on the air output hose a distance from a distal end of the air output hose that is less than 50% of the length of the air output hose.

8. A pump apparatus comprising:
a pump configured for moving air;
a housing supporting the pump, the housing comprising a rest;
an air output hose in communication with the pump;
a mount configured to couple to the housing at a connection point between the air output hose and the housing, the mount comprising a tubular body defining a central passage; and
a sleeve supported by the mount such that the tubular body is received within the sleeve, the sleeve having a first end configured to be pulled from the tubular body along with at least a portion of a length of the sleeve in order to cover the air output hose;
wherein the rest is configured for retaining a portion of the air output hose.

9. The pump apparatus of claim 8, further comprising a connector connected to the sleeve proximate the first end and supported by the tubular body, wherein the connector is configured to removably connect the first end of the sleeve to the air output hose when the first end of the sleeve is pulled from the tubular body.

10. A pump apparatus comprising:
a pump configured for moving air;
a housing supporting the pump, the housing having a top portion, a base portion, and a sidewall extending between the top portion and the base portion;
a handle removably coupled to the top portion, the handle separated from the sidewall and the base portion by the top portion;
an air outlet positioned on the top portion;
an air output hose coupled to the air outlet; and
an attachment structure configured for retaining the air output hose when not in use;
wherein the pump is configured to move air to the air outlet.

11. The pump apparatus of claim 10, wherein the attachment structure comprises a shape to receive a portion of the air output hose.

12. The pump apparatus of claim 10, wherein the attachment structure is a clip mounted on the housing, configured to attach to a distal end of the air output hose.

13. The pump apparatus of claim 12, wherein the clip and the distal end of the air output hose are magnetic.

14. The pump apparatus of claim 13, wherein the distal end of the air output hose includes a metal wire or a metallic material.

15. The pump apparatus of claim 12, wherein the clip has a slot and the distal end of the air output hose includes a flange, wherein the clip is configured to receive a portion of the flange.

16. The pump apparatus of claim 12, wherein the clip comprises retaining features configured to couple to the air output hose by a friction fit.

17. The pump apparatus of claim 12, wherein the clip includes a resilient member or a releasable lock to couple to the distal end of the air output hose.

18. The pump apparatus of claim 10, wherein the housing further includes a rest for the air output hose.

19. The pump apparatus of claim 18, wherein the rest is shaped like a saddle.

20. The pump apparatus of claim 18, wherein the air output hose extends between a proximal end and a distal end, the proximal end is configured to be coupled to the air outlet, the distal end is configured to be coupled to the attachment structure, the rest is configured to retain a portion of the air output hose between the proximal end and the distal end.

\* \* \* \* \*